United States Patent
Van Heck

(10) Patent No.: US 9,421,711 B2
(45) Date of Patent: Aug. 23, 2016

(54) DEVICE AND METHOD FOR PROVIDING A CONTINUOUS TUBULAR FOIL

(71) Applicant: FUJI SEAL INTERNATIONAL, INC., Osaka-shi, Osaka (JP)

(72) Inventor: Marinus Antonius Leonarda Van Heck, Uden (NL)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 26 days.

(21) Appl. No.: 14/385,668

(22) PCT Filed: Mar. 15, 2013

(86) PCT No.: PCT/NL2013/050192
§ 371 (c)(1),
(2) Date: Sep. 16, 2014

(87) PCT Pub. No.: WO2013/137738
PCT Pub. Date: Sep. 19, 2013

(65) Prior Publication Data
US 2015/0047772 A1    Feb. 19, 2015

(30) Foreign Application Priority Data

Mar. 16, 2012    (NL) ...................................... 2008499

(51) Int. Cl.
*B29C 65/00* (2006.01)
*B29C 63/42* (2006.01)
(Continued)

(52) U.S. Cl.
CPC .............. *B29C 63/42* (2013.01); *B29C 63/423* (2013.01); *B29C 65/50* (2013.01);
(Continued)

(58) Field of Classification Search
CPC ............ B29C 31/002; B29C 65/5042; B29C 65/7808; B29C 65/7838; B29C 66/41; B29C 66/52211; B29C 66/52271; B29C 66/61; B29C 66/612; B29C 66/65

USPC ............ 156/298, 304.2, 423, 433, 440, 503, 156/504, 505, 545
See application file for complete search history.

(56) References Cited

U.S. PATENT DOCUMENTS 4,610,742 A * 9/1986 Rop ........................ A22C 13/00
138/118.1
7,073,552 B2 * 7/2006 Dyrlund .............. B29C 66/1142
156/304.1
(Continued)

FOREIGN PATENT DOCUMENTS

AT    413 378 B    2/2006
EP    1 201 585 A1    5/2002
(Continued)

OTHER PUBLICATIONS

International application WO 96/36482.*
(Continued)

*Primary Examiner* — Mark A Osele
*Assistant Examiner* — Nickolas Harm
(74) *Attorney, Agent, or Firm* — Oliff PLC

(57) ABSTRACT

Method and device for forming a continuous tubular foil (106, 308). Foil (106, 308) is supplied and buffered. Foil (106) is supplied as flattened tubular foil (106) from a supply. A next piece of foil (308) is supplied from a next supply. The ends of tubular foil (304, 309) are connected. This then allows supplying and buffering next tubular foil (308) supplied from the next supply. The device and method allow connecting the ends of tubular foils (304, 309) by opening the end (309) of the next flattened tubular foil (308) supplied from the next supply and moving the end of the flattened tubular foil (304) in an upstream direction (299) into the opened end of next tubular foil (309) from the next supply. Connection is made using a tape (250, 270) applied onto the foil ends (304, 309).

14 Claims, 17 Drawing Sheets

Figure 1A:
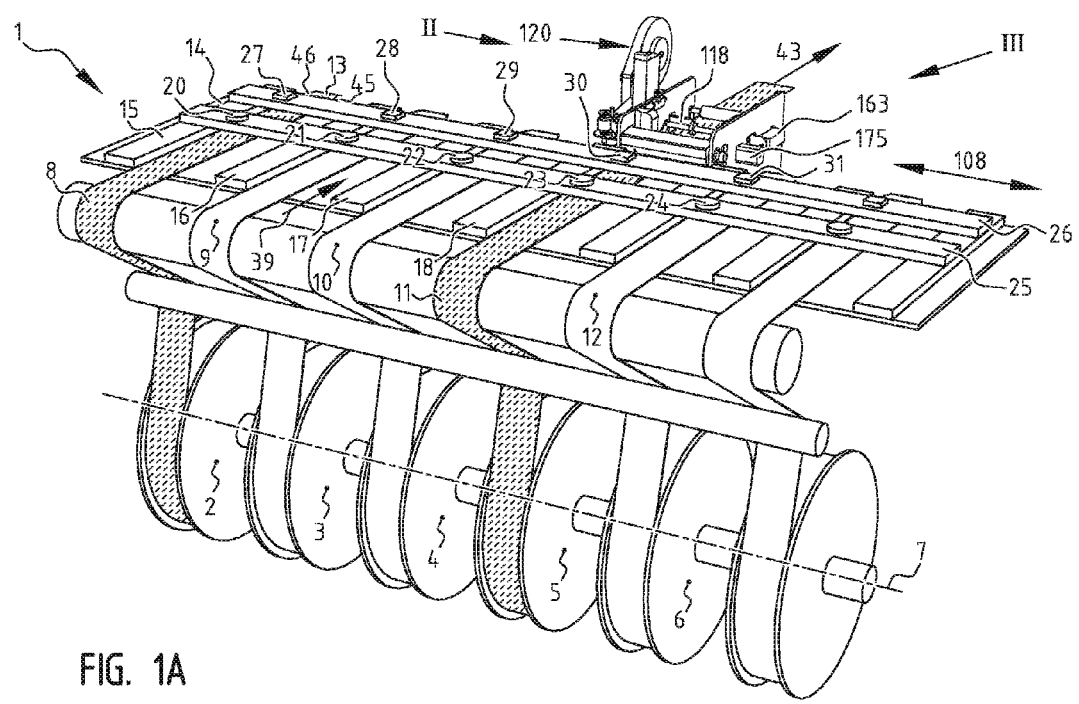

(51) Int. Cl.
*B29C 65/50* (2006.01)
*B65H 19/18* (2006.01)
*B65C 3/06* (2006.01)
*B29C 31/00* (2006.01)
*B29C 65/78* (2006.01)
*B29L 23/00* (2006.01)

(52) U.S. Cl.
CPC ...... *B29C 65/5042* (2013.01); *B29C 65/5092* (2013.01); *B29C 65/78* (2013.01); *B29C 65/7802* (2013.01); *B29C 65/7832* (2013.01); *B29C 65/7841* (2013.01); *B29C 65/7847* (2013.01); *B29C 66/1122* (2013.01); *B29C 66/43* (2013.01); *B29C 66/5221* (2013.01); *B29C 66/83241* (2013.01); *B29C 66/853* (2013.01); *B65C 3/065* (2013.01); *B65H 19/18* (2013.01); *B65H 19/1852* (2013.01); *B29C 31/002* (2013.01); *B29C 65/7808* (2013.01); *B29C 65/7817* (2013.01); *B29C 65/7838* (2013.01); *B29C 66/41* (2013.01); *B29C 66/52211* (2013.01); *B29C 66/52271* (2013.01); *B29C 66/61* (2013.01); *B29C 66/612* (2013.01); *B29C 66/65* (2013.01); *B29C 66/652* (2013.01); *B29C 66/8432* (2013.01); *B29C 2795/002* (2013.01); *B29L 2023/001* (2013.01); *B65H 2301/46015* (2013.01); *B65H 2301/4631* (2013.01)

(56) References Cited

U.S. PATENT DOCUMENTS

| | | | |
|---|---|---|---|
| 7,390,245 B2 * | 6/2008 | Brettschneider | A22C 13/00 452/35 |
| 2002/0074078 A1 * | 6/2002 | Van Heck | B29C 65/18 156/159 |
| 2007/0079923 A1 * | 4/2007 | Deininger | B29C 65/08 156/159 |
| 2009/0133821 A1 * | 5/2009 | Ederer | B26D 1/305 156/258 |

FOREIGN PATENT DOCUMENTS

| | | |
|---|---|---|
| FR | 2 692 566 A3 | 12/1993 |
| JP | A-60-97797 | 5/1985 |
| JP | Y2-62-43961 | 11/1987 |
| JP | A-2010-275024 | 12/2010 |
| WO | WO 2008/088210 A1 | 7/2008 |

OTHER PUBLICATIONS

Dutch Search Report issued in Dutch Patent Application No. NL 2008499 issued Oct. 19, 2012 (with translation).
Dutch Written Opinion issued in Dutch Patent Application No. NL 2008499 issued Oct. 19, 2012.
International Search Report issued in PCT/NL2013/050192 issued mailed Jul. 12, 2013.
Written Opinion of the International Searching Authority issued in PCT/NL2013/050192 mailed Jul. 12, 2013.

* cited by examiner

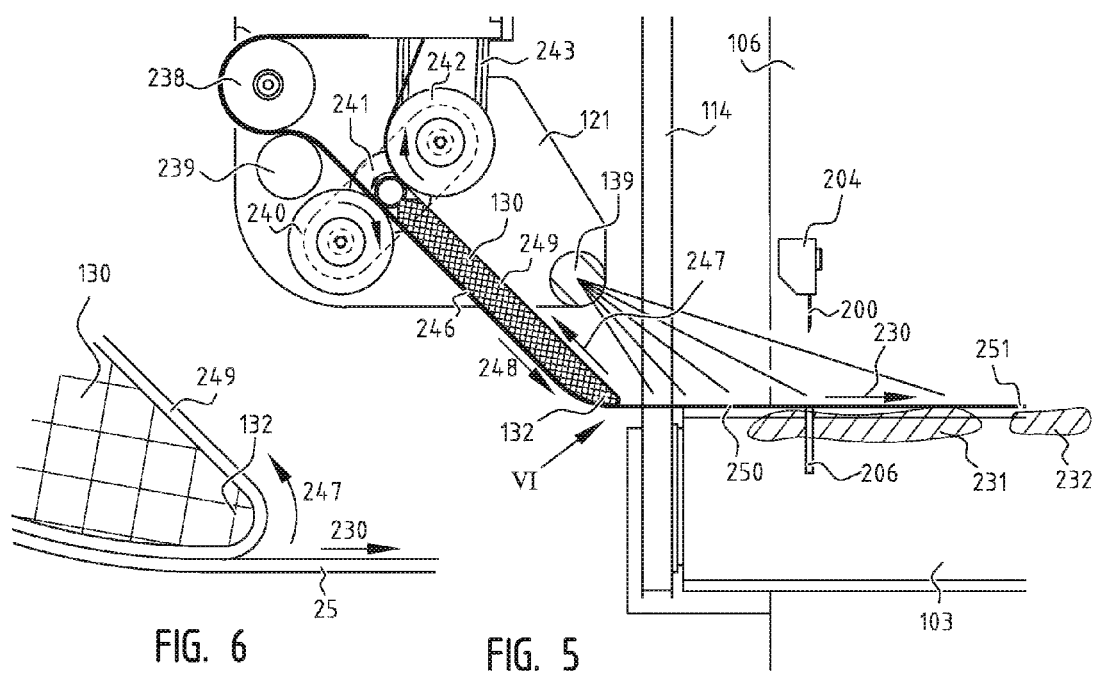

DEVICE AND METHOD FOR PROVIDING A CONTINUOUS TUBULAR FOIL

The invention relates to a device and a method for providing a continuous tubular foil by connecting two ends of tubular foil. The invention also relates to a controller arranged to execute the method.

Arranging sleeves around containers is a well known, low cost labelling method for providing a suitable label on a container. Included by reference is WO 2008/088210 A1 by the same applicant disclosing prior art methods and devices. Tubular foil is used to form the envelope-like sleeves that can be arranged around a container as a label. In an embodiment a sleeve is heat-shrunk around the container for fixing the sleeve around the container.

Foil is supplied to a sleeving apparatus for sleeving the container from a reel. The tubular foil is provided as a flattened tube of plastic foil. The flattened tubular foil is supplied at high speeds. By connecting ends of tubular foil a continuous supply of foil can be achieved. Connecting devices are provided to switch from foil of an almost empty reel to foil supplied from a new, filled reel. The connection device allows connecting the end of the downstream (old) tubular foil with an end of the upstream (new) tubular foil from a new reel. Different connection methods are known, e.g. using a tape or making a sealed connection.

The supply can comprise one or more reels containing winded tubular foil. Once supplied, the tubular foil is guided into the device following a foil trajectory. The foil trajectory is the surface in which the foil is transported. The one or more processing units can provide guidance.

During interruption of the supply, i.e. during the process of switching from one supply to the next and making the connection, foil can still be supplied for downstream processing from a buffer.

A prior art arrangement is known from EP 1 201 585 by the same applicant and incorporated by reference. A flattened tubular foil from a new reel/next supply has a leading edge and corners are cut away. This allows opening of the thus formed two loose lips, separating the lips from each other. Another end of tubular foil can be positioned between the lips and can be fixed either by sealing or using tape. The lips can also be formed by cutting the leading edge on both longitudinal edges sidewardly.

In JP 62-043961 Y2 a tape splicer is disclosed showing an opened 'mouth' of an end of tubular foil into which another end of tubular foil is positioned. The other end of foil is moved into the opened end by a sideward movement perpendicular to the transport direction of the foil.

To execute and control the connecting of two ends of foil many complex motions are to be executed requiring subsequent complex control and drives. Not only does this result in complex motions, but also costs of machines in general. Wear of the machines is high.

Document AT 413 378 discloses a device for connecting foil ends supplied from a roll. The device is configured to connect the foil ends by a welding process and is unsuitable for connecting foil ends using tape.

Document JP 60 097797 discloses a foil that is supplied and cut to provide a foil end. A further foil is held 'opened' using some kind of engagement mechanism and the end of the further foil is somehow provided with a piece of tape. Closing the further foil ends causes the piece of tape to be positioned over the end of foil in order to make a connection between both foil ends.

It is therefore a goal of the invention, according to at least one aspect, to provide a method and/or device for supplying a continuous tubular foil and specifically for connecting two ends of tubular foil that improve prior art arrangements.

It is a further goal of the invention to provide a method and device that allow for joining of the foil ends in a relatively simple manner and/or by using a device of reduced complexity.

At least one of these goals is achieved with a method for forming a continuous tubular foil as claimed in claim 1.

Foil is supplied from a supply and buffered. The buffering allows temporary storage of the continuous tubular foil. The next tubular foil can be supplied from a next supply. According to embodiments of the method, the method can switch to a next supply when the current supply is close to empty, connect the foils and continue to provide foil to downstream applications.

According to an embodiment an end of tubular foil from the supply is connected to an end of next tubular foil from the next supply. After connecting the foils, tubular foil from the next supply is buffered. During the switch from one supply to the next, supply of foil is interrupted. During this interruption foil can still be provided to further downstream operations from the buffered foil.

Tubular foil is circumferential in cross section. Flattened tubular foil comprises in at least two layers positioned one above the other. A flattened tubular foil has at least two longitudinal edges formed along the supply direction.

According to an embodiment connecting the ends of tubular foils comprises opening the end of the next foil supplied from the next supply and moving the end of the flattened tubular foil in an upstream direction into the opened end of the next foil. According to the method the transport direction of the foil is used as a tool for performing one step of the method, bringing the one end of foil in the opened end of the next foil, for connecting the two ends of tubular foil. This reduces the complexity of the method.

Opening an end of tubular foil comprises moving apart the ends or lips formed by the two layers of tubular foil. In an embodiment the ends or lips are partially disconnected, either by removing the cut-away corner, as known from EP 1 201 585, by cutting the longitudinal edges or by another method.

In an embodiment the method comprises moving both ends in the upstream direction, e.g. as part of a step of the method for connecting the ends.

In an embodiment the method comprises dispensing tape on a tape receiving surface of a tape applicator, holding the tape on the tape receiving surface, applying the tape to and connecting the ends of the tubular foil and releasing the tape. According an embodiment tape is supplied on a tape receiving surface of a tape applicator and the tape is held on said surface. The tape can be adhesive tape. The tape can be one sided adhesive tape. In an embodiment tape can be used to open the lips formed at the leading edge of the foils. By applying the tape on one of the lips, that lip is engaged. Only a portion of the tape needs to be applied. In this embodiment applying the tape allows the opening of the leading edge. As the tape is applied using the tape applicator, said tape applicator is also used to open the first end.

According to embodiments of the invention the method comprises applying the adhesive side of one-sided adhesive tape to the end of the tubular foil and opening the end of the tubular foil displacing the adhesive tape sticking to the end of the tubular foil. The adhesive tape maintained by the tape applicator (for instance by a suction force holding the tape on the tape receiving surface of the tape applicator) will stick to the upper side or bottom side of the end of the tubular foil when the tape applicator and therefore the tape maintained by the tape applicator is displaced, for instance rotates, so as to open the mouth of the tubular foil.

According to embodiments of the invention the method comprises:
- moving a tape applicator with tape towards the end of the next flattened tubular foil;
- applying tape onto said end of the next flattened tubular foil;
- moving the tape applicator away from the next tubular foil end for opening the foil end;
- moving the end of the flattened tubular foil in into the opened next tubular foil end;
- moving the tape applicator with tape towards the end of the flattened tubular foil;
- applying the tape applied to the end of the next flattened tubular foil onto the end of the flattened tubular foil;
- releasing the tape from the tape applicator.

The tape applicator is used to apply tape to the new foil end by moving the tape applicator holding the tape in the direction of the foil end, to open the new foil end by moving the tape applicator holding the tape and thereby also holding the foil end adhered to the tape, away
from the foil end and/or to apply tape adhered to the new foil end to the old foil end by moving the tape applicator in the direction of the old foil end.

In embodiments of the invention only one tape applicator is provided and tape is applied to one side of the foil ends only. In other embodiments two tape applicators are provided and tape is applied on both sides of the foil ends for an even stronger connection of the foils.

The method may also comprise applying tape to a first side of a tubular foil end and at substantially the same time applying tape to a second, opposite side of a tubular foil end. In this way tape may be synchronously applied to both sides of the end of the (old) foil or the (new) next foil. In a similar manner the method may comprise opening a first side of a tubular foil end and at substantially the same time opening the second, opposite side of the tubular foil end. In embodiments of the invention pieces of tape are applied both the upper part of the foil end and the bottom part of the foil end. In this manner the pieces of tape adhered to both sides of the (old) foil may be used to synchronously open the upper foil end part and the lower foil end part.

According to embodiments of the invention the method comprises arranging tape on a tape receiving surface of a first tape applicator and arranging tape on a tape receiving surface of a second tape applicator while supplying and buffering flattened tubular foil from the supply in the transport direction. The transport of foil towards the sleeving apparatus.

In an embodiment applying the tape to the foil comprises moving the end of the foil, preferably the next foil, in an upstream direction, i.e. in a direction opposite the transport direction.

In a further embodiment opening the first end of the tubular foil comprises rotating the tape receiving surface. Rotating the tape surface results in a controlled motion, reduces complexity of the method and lowers the costs.

In an embodiment applying and/or connecting the tape to the ends of tubular foil comprises rotating the tape receiving surface in an upstream direction and moving the next tubular foil in an upstream direction. Clearly the surface of the tape applicator engaging the foil is moving in an upstream direction, which in turn will push the foil in an upstream direction. A single degree of freedom, here rotation, allows in different steps of the method obtaining different results, here application of tape followed by connecting the ends, reducing the overall complexity and implementation of the method.

In an embodiment the foil ends are connected by two tapes on opposite sides of the flattened tubular foil, wherein applying the tape comprises moving the two tape receiving surfaces towards each other. At least one of the tape applicators is movable with respect to the other. This approaching movement of the tape receiving surface can be in a direction parallel to the foil trajectory allows positioning the tape applicator at a distance from the foil. The approaching movement allows approaching the foil for connecting the tape to the foil and allows pushing or forcing the tape onto the first end and/or the second end for connection.

In an embodiment the method comprises aligning the tubular foil ends. Aligning can comprise sensor for measuring the position of the tubular foil, but can also comprise positioning the tubular foil in a specific position before connecting.

According to another aspect of the invention at least one of the goals is achieved by a device as claimed in claim 11. The device is configured for supplying a continuous tubular foil and specifically allowing connecting of two ends of tubular foil. The device according to the invention can comprise a supply for supplying flattened tubular foil and a next supply for supplying flattened tubular foil. Foil is processed in the device by a processing unit for transporting the foil defining a foil trajectory. Preferably the foil processing unit is configured to be able to move the foil both in the upstream as downstream direction so that the same processing unit may be used for supplying foil to the sleeving apparatus and for connecting a next foil (new foil) to another (old) foil. This may rendered to device less complex and may save costs.

The device also comprises a buffering unit for buffering an amount of tubular foil received from the processing unit. The buffering unit allows maintaining an amount of tubular foil when supply of tubular foil is interrupted. Tubular foil is continuously provided for downstream processing from the buffer.

According to an embodiment the device further comprises a connecting unit for connecting an end of tubular foil to an end of a next flattened tubular foil, positioned downstream from the foil supplies and along the foil trajectory.

According to embodiments of the invention the connecting unit is configured to:
- move the tape applicator with tape towards the end of the next flattened tubular foil for applying tape onto said end of the next flattened tubular foil;
- move the tape applicator away from the next tubular foil end for opening the foil end;
- move the end of the flattened tubular foil in into the opened next tubular foil end;
- move the tape applicator with tape towards the end of the flattened tubular foil for applying the tape applied to the end of the next flattened tubular foil onto the end of the flattened tubular foil;
- move the tape applicator away from the foil ends for releasing the tape from the tape applicator.

In this embodiment the one or more tape applicators holding the tape are used for opening one of the foil ends in addition to applying the tape to both of the foil ends. In this manner a simple and accurate device for connecting the foil ends may be achieved.

The device according to the invention is arranged to transport the end of tubular foil in an upstream direction into the opened end of the next tubular foil. Accordingly a degree of freedom of the foil is used to bring together the foil ends for making the connection. This reduces the complexity of the device for making the connection. On the other hand opening the end of tubular foil can be performed at a distance from the end of tubular foil to which the end is to be connected. Only after opening the end of foil from the next supply the other end is moved towards the opened end.

In an embodiment the device is arranged to move both the end of the foil and the end of the next foil in the upstream direction.

The connecting unit can comprise a tape dispenser. In an embodiment the connecting unit also comprises a tape applicator having a tape receiving surface arranged to receive tape from the tape dispenser, the tape applicator arranged to apply tape to and connect by tape the ends of tubular foil. This allows obtaining a device connecting the foil ends using tape.

In an embodiment the tape applicator is mounted rotatably around a tape applicator axis. The tape applicator is mounted in a frame. The tape applicator axis extends generally parallel to the foil trajectory and generally perpendicular to a transport direction of the foil. A drive for driving the tape applicator around the tape applicator axis is arranged to rotate the tape applicator in an upstream direction to apply tape to the foil followed by rotation in a downstream direction to open the end of the foil. Hereby a single degree of freedom of the tape applicator, rotation, allows performing two steps of the method for connecting the end by tape.

In an embodiment the drive is arranged to rotate the tape applicator to move the end of next tubular foil in a first direction, i.e. an upstream direction opposite the transport direction. Engaging the end of tubular tape from the next supply using tape by rotating the tape applicator causes that end in the upstream direction.

In an embodiment tape applicator is arranged to pull the one end of foil in an upstream direction. When the one of foil is positioned in the opened end of foil from the next supply, the tape applicator can rotate in an upstream direction, pulling both ends in an upstream direction, while simultaneously connecting the two ends by tape.

At least two tape applicators can be mounted on opposite sides of the foil trajectory, the tape applicators having generally parallel extending tape surfaces. This allows receiving the foil between the tape applicators and applying tape to both flat surfaces of the flattened tubular foil.

In an embodiment at least one tape applicator is mounted on a table frame moveable with respect to a frame of the device over a table guide extending generally perpendicular to the foil trajectory. The table frame can support the connecting unit such as the tape applicator(s). This allows positioning multiple next supplies of flattened tubular foil adjacent one and other and allows to subsequent interrupt and switch to a next supply multiple times, using the same connecting unit on the table frame each time.

In an embodiment the device comprises an alignment unit for aligning the ends of tubular foil. When connecting the tubular foils the ends should be aligned in order not to disturb further downstream processing. Suitable sensors can be positioned upstream and downstream from the connecting unit. Part of the alignment unit can be positioned on the table frame together with the connection unit.

According to a further aspect a controller is provided arranged to execute the method or operate in the device according to any of the embodiments mentioned in this application.

In an embodiment, the device for connecting two ends of the foil by an adhesive tape comprises one or more tape applicators configured for applying tape to and connecting the ends of tubular foil. In an embodiment the one or more tape applicators are positioned downstream from the supply along the foil trajectory.

In an embodiment, the tape applicator comprises a tape receiving surface, having one or more tape holders arranged to, when switched on, fix the position of the tape on the tape surface. The tape surface can be a rectangular surface. Tape holders can be embodied by openings/through holes in the tape surface allowing to provide a vacuum when tape is positioned onto the surface. Applying a vacuum will result in fixing the position of the tape onto the surface. The vacuum generator can be switched on and off by a suitable controller and is switched on when tape is supplied to the predetermined position and is switched off after the tape is connecting the ends of the tubular foil.

According to yet another aspect a device is provided for providing a continuous foil. The device comprises a supply for supplying a foil; a next supply for supplying a next foil; a processing unit for transporting the foil defining a foil trajectory; a buffering unit for buffering an amount of foil received from the processing unit; and a connecting unit for connecting an end of foil to an end of the next foil, positioned downstream from the supply along the foil trajectory. The device is arranged to move one of the ends in the upstream direction. This allows connecting the ends. E.g. the next foil end is moved in the upstream direction for applying tape to that end.

In an embodiment the device is arranged to transport the end of the foil in an upstream direction towards the end of the next foil. Preferably a tape dispenser is arranged to apply tape to one of the ends, preferably the end of the next foil, prior to the feeding in the upstream direction.

Various embodiments are possible within the scope of the invention. The scope of protection is by no means limited by the illustrated embodiments. Although the invention will now be described with reference to the drawing and the claims, other (partial) aspects of the embodiments illustrated explicitly or implicitly disclosed herein, could be the subject of divisional patent applications.

Although not shown in the figures, it will be clear to the skilled person that any or each of the mechanical components can be connected to a suitable drive, in some embodiments, servo motors, that in turn can be connected to a controller for executing the method. In the figures, some of these drives, power connections, as well as connections to a controller are not shown in detail. These connections can be wired or wireless. The controller can be a computer implemented controller having an interface, and preferably having a user interface comprising a screen, input means and network connection providing a suitable bus control.

Although some embodiments are directed at processing a (flat) tubular foil, clearly the features are not limited to such a foil. Although tape is used to connect foil ends, the invention is not limited to applications using tape.

Figure 1B:
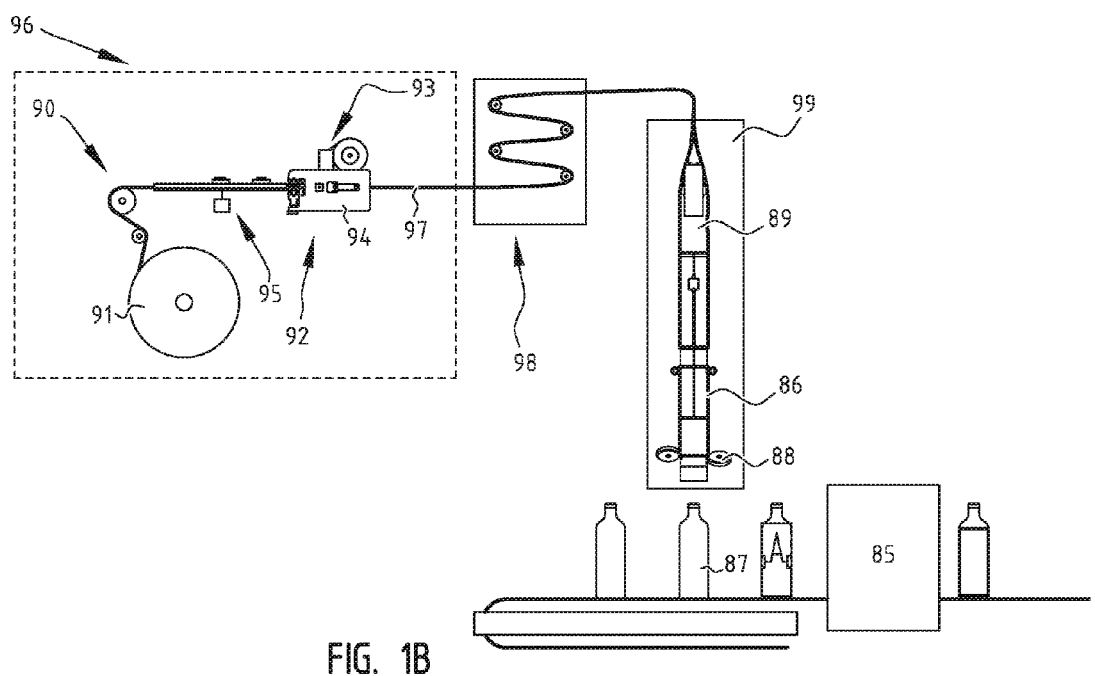
Figure 2:
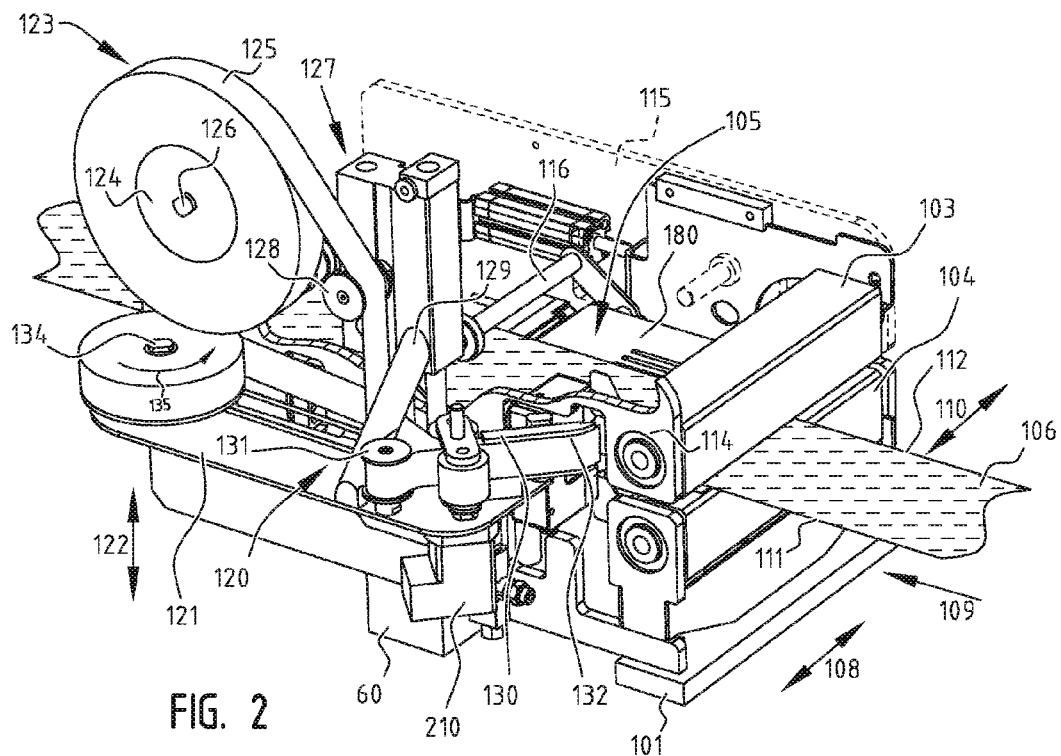
Figure 3:
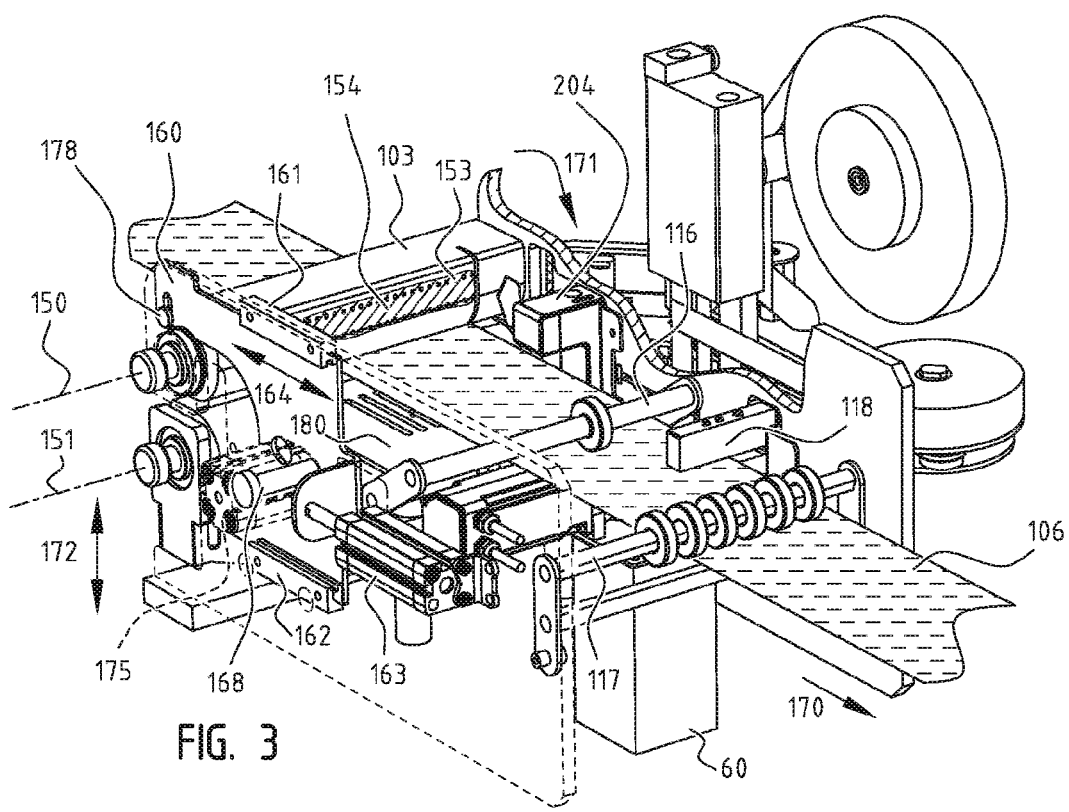
Figure 7:
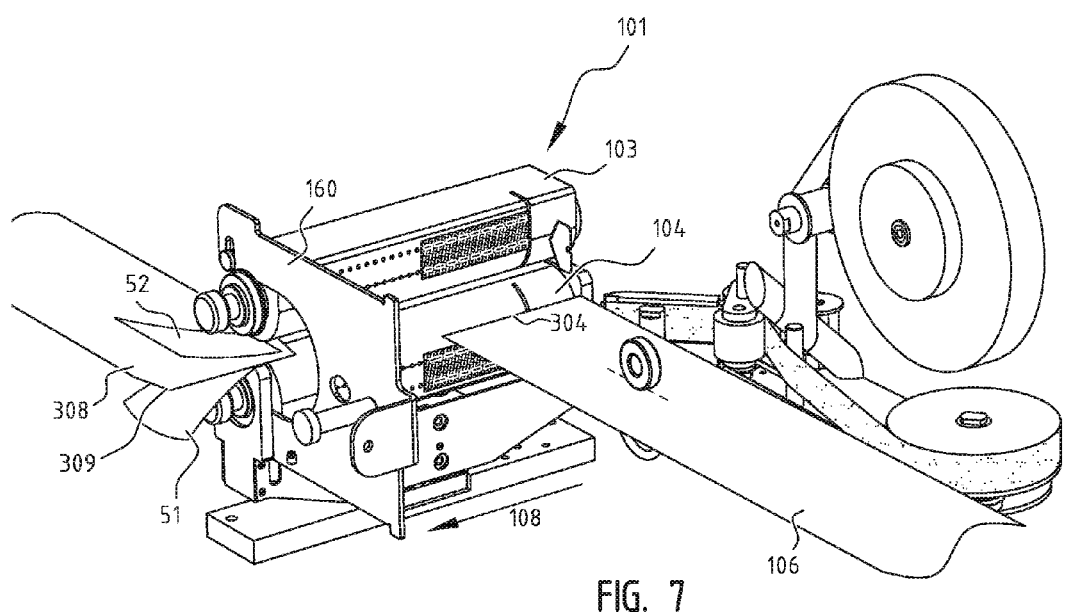

The invention will now be described with reference to the drawing showing embodiments of the method and device as well as the controller according to the invention, in which:

FIG. 1a shows an overview of an embodiment of the splicer according to the invention, FIG. 1b shows a schematic overview of a system for sleeving containers using tubular foil, FIG. 2 shows a perspective view of a carriage sub frame of a splicer device seen in the direction according to arrow II, FIG. 3 shows a perspective view of a carriage sub frame of a splicer device according to arrow III in FIG. 1, FIGS. 4a-4g show steps of tape dispensing on the tape applicator of a splicer device according to an embodiment of the invention, FIG. 5 shows a top view of the tape dispenser and tape applicator according to an embodiment of the invention, FIG. 6 shows a detail according to VI in FIG. 5, FIG. 7 shows a detail of the most relevant tape applicator parts of the carriage sub frame of a splicer device, and FIGS. 8a-8h show consecutive steps for applying a tape to foil and connecting the foil ends.

FIG. 1a shows a splicing device 1. A splicing device 1, in a preferred embodiment a tape splicing device, allows providing a continuous feed of foil to downstream applications of foil. In the drawing the splicer device 1 comprises a device for tape dispensing 120, a device 103,104 for applying and connecting tape to a foil and a device to connect ends of tubular foil. The splicer device is arranged to execute methods to dispense tape, to connect foil using tape, and to connect ends of foil.

In the illustrated embodiment tubular foil of flattened form is used. Several foil supplies are provided and the splicer 1 allows connecting an end of an old foil with a beginning of a new foil. Several connection methods are available, including sealing. In the preferred embodiment a tape is used for connecting the tubular ends. Although the method will illustrate connecting tubular foil with two pieces of tape, clearly the invention also comprises using a single piece of tape or applying tape to non-tubular foil.

Several reels 2-6 are mounted to the frame of the splicing device 1 allowing rotation around an axis 7. Each reel is mountable on a separate axle sharing the axis 7. The reels 2-6 comprise wounded tubular foil in a flattened state. The foil can be imprinted. A full reel is put into the splicing device. An empty reel 2-6 can be replaced by a new reel. The splicer 1 can have more reel positions than illustrated, such as seven, or less reel positions.

Foils 8-12 are supplied from the respective reels. The reels form the supply for flat tubular foil for further downstream processing. In other embodiments a single layered foil is supplied.

A leading end 13 of one of the foils is positioned on a guidance and cutting table 14. The guidance and cutting table 14 allows an operator to position a foil end in a predetermined position so as to allow further processing. The table 14 allows guidance of the foils 8-10 along guiding blocks 15-17. The guiding blocks 15-18 can be aligned with the reels. In an embodiment the guidance and cutting table 14 comprises drives to position the (end of a) foil in a predetermined position.

The guidance and cutting table 14 also comprises individually controllable foil stops 20-24 part of a first bridge 25 that covers the foils 8-12 when they are fed over the table 14 surface. The individually controllable foil stops 20-24 allow holding the foils 8-12 in their current position. In the shown embodiment at least foils 8-10 are locked in position.

A further bridge 26 also covers the foil trajectory of the respective foils 8-12. Bridge 26 comprises individually controllable, schematically illustrated, cutting devices 27-31 that allow cutting the foil in a direction generally perpendicular to the foil feeding direction 39. An example of an actual knife part 300 of a cutting device 27-31 is shown in FIG. 4g. The table 14 can have slits positioned under bridge 26 that allow cutting the foil using knives. In an embodiment a cutting device is mounted movably in direction 108 underneath the table 14. A single cutting device is then able to cut the supplied foil.

In the shown embodiment foil 11 is currently being supplied from the reel 5 over the table 14, under the bridges 25,26 to a carriage sub frame 101. When the reel 5 runs empty, an end of the foil will be formed. The splicer 1 will connect the formed end with an end of a further foil supplied from one of the other reels 2-4, 6.

Foils 8-10, 12 supplied from reels 2-4, 6 form further foils. The further foils each have an end, in this embodiment positioned by the operator, extending somewhat from guidance and cutting table 14.

In FIG. 1a foil 11 is supplied in the foil feeding direction 39. The foil alignment unit 105 is cooperating with the guiding block 18 to feed the foil in a preferred position, specifically the alignment in the direction 110.

When foil 11 is supplied, the carriage sub frame 101 allows passage of the foil 11 for further downstream handling/processing 43. Elements on the carriage sub frame 101 surround the foil trajectory.

FIG. 1b shows a schematic overview of a device for sleeving containers. Clearly many other applications could benefit from the devices and methods according to this disclosure and the inventions are in no way limited to the illustrated sleeving device/method.

A schematically illustrated supply 90 having a reel 91 supplies tubular foil in flattened state to a device 92 for applying to and connecting foil by tape having a tape dispenser 93. Only carriage sub frame 94 is illustrated. A schematically illustrated cutting device 95 can cut the foil and carriage sub frame 94 can move in order to allow connecting the old cut foil with a new foil from a new supply. From the splicer 96 foil 97 is fed to a buffer device 98. The buffer device 98 can contain a supply of foil. Foil is fed from the tape splicer 96 and is continuously fed further downstream. When foil supply from the splicer 96 is interrupted, e.g. when a reel runs empty, foil is fed to further downstream application from the buffer supply held in the buffer device.

Downstream from the buffer device 98 a sleeving device 99 can comprise a mandrel 89 that opens the tubular foil, cuts sleeves 86 and shoots 88 the individual sleeves over containers 87 such as bottles. Further downstream the bottles are led through an oven 85 that will heat shrink the sleeve onto the container.

In accordance to the invention any of the units downstream from the supply of foil is a processing unit. The unit connecting the ends of foil are a specific example. Although in the shown embodiment the connection unit is supported by the carriage 101, the connection unit can be mounted on other frame parts.

Now the carriage sub frame 101, in the shown embodiment carrying the device for applying and connecting tape to a foil will be discussed in more detail.

The carriage sub frame 101, shown in more detail in FIG. 2, supports a tape dispenser 120, tape applicators 103 and 104, foil alignment unit 105 and several foil 106 guiding element. Further a suitable drive is pulling the foil.

Carriage sub frame 101 is arranged in the splicer device 1 such that it can be moved according to arrow 108 with respect to the frame of the splicer device 1. A suitable drive is arranged to initiate and stop movement of the carriage sub frame in direction 108. Servo drives or other electrical drives can be used for moving the carriage sub frame 101. Suitable sensors can be arranged on either the frame of the splicer device 1 or on sub frame 101 for determining and measuring the position of the carriage sub frame 101 with respect to the splicer device/frame.

When it is determined that reel 5 is running empty, a splicing method, in a preferred embodiment a tape splicing method, is initiated. The foil 11 is stopped and held by stop 23. The foil 11 is cut using a knife in cutting device 30 allowing cutting the foil at a predetermined position. This will form the end edge of an 'old' or first foil. The operator has prepared 'new' or second foil ends, such as leading end 13.

In the shown embodiment the leading end 13 is provided with an obliquely cut-away corner at both longitudinal edges, such as known from EP 1 201 585 A1 from the same applicant and incorporated by reference. In an embodiment a single layered foil is supplied having no pre-processed leading end.

The tubular foil 8 comprises at least two layers of foil connected near the edges. By cutting that edge, and in an embodiment by removing a part of the foil, the leading end 13 now comprises two layers that can be separated somewhat from each other. The cut-aways form loose lips that can be separated from each other, i.e. the mouth of the leading end 13 can be opened. In another embodiment the lips are separated by cutting the side edge without removing material.

After cutting the foil 11 and transporting the formed end 304 downstream such that it is positioned inside the carriage sub frame, see e.g. FIG. 7, carriage sub frame 101 can e.g. move from that first position towards a second position close to leading end 13. On both transverse sides the carriage sub frame 101 has guiding wings 51,52 that allow receiving the leading end 13 in between the wings 51,52 and as a result in between tape applicators 103,104 as will be described in more detail. In further subsequent steps, because of the predetermined position of leading end 13, a splicing method connecting the ends of foil, can be executed.

In any embodiment of the invention a first position of a foil end is a position of a foil end formed when the supply (reel) runs (close to) empty. A second position is a position close to an end of a further foil to which the formed end is to be connected. In the shown embodiments the difference between a first and second position is in a direction 108 and can be overcome by transferring the carriage sub frame 101 in the direction 108.

In any embodiment a foil end holding unit can any of the processing units positioned along the foil trajectory that offers some control over the position of the end of the foil. The formed end of the foil is received in the carriage sub frame as a result of conveying the foil further downstream. The foil end holding unit doesn't have to actually engage the foil end.

The operator can replace the empty reel 5 by a new reel and position the new foil on the table 14 in the predetermined position.

Returning to FIG. 2, foil 106 is supplied in direction 109 from a reel with winded tubular foil. The tubular foil 106 will pass tape applicators 103, 104 positioned on opposite sides of the foil trajectory.

The position of the foil in the transverse direction 110 of the foil supply is guided and adjusted using the foil aligning unit 105. Suitable sensors determine and measure the position of the foil 106 and in particular sides 111 and 112 of foil 106 and, if needed, foil aligning unit 105 will engage foil 106 to correct the position of the foil in the transverse direction 110 back to a default position. The default position of the foil 106 is the position of the foil in which foil connection can be made. A position sensor can e.g. detect the side position of the foil 106.

Registration sensor 204 is arranged to monitor the foil and in particular the prints on the foil. Connecting the old foil and new foil is to be arranged such the repetitive print remains at the same pitch. Therefore the pitch is determined at the sensor 204 allows cutting at a predetermined position, e.g. exactly in between the prints.

Foil alignment unit 105 is connected to drive 60, in an embodiment a servo motor, that will move the alignment frame 180, e.g. by tilting, in the direction in order to align edges of the foil in the default position with regard to the transverse direction 110.

In order to allow an overview of the device, many of the frame parts are shown either only partially, such as frame part 114 or are shown with dotted lines 115, such as frame part 115.

A downwardly biased arm 116 will force the foil 106 in a downward direction onto a wheel 145, see FIGS. 3 and 4. Wheel 145 has a fixed position with bearing with respect to the foil alignment frame 180. It can be driven. In an embodiment the wheel 145 and arm 116 cooperate to e.g. brake the movement of the foil 106, e.g. when the supply of foil is running empty.

A further downstream rigid arm 117 comprising bearings with rollers prevents upward movement of the foil. After arm 117, foil 106 can bend upwards (not shown).

When foil 11 is supplied from the reel 5 the alignment unit and foil feed are continuously aligning/driving the foil.

The tape dispenser is generally indicated with reference numeral 120 and is positioned sideways from the foil 106 along a side of the carriage sub frame 101. The tape dispenser 120 is positioned on a further sub frame 121 that can be moved with respect to carriage sub frame 101 according to arrow 121 in an upward and downward direction using suitable drive.

Tape dispenser 120 comprises a tape supply 123. In this embodiment the tape supply 123 comprises tape 125 with protection sheet winded around a reel 124 that can rotate around an axis 126. Tape is supplied in direction 127 and guided by wheels 128 and an angled guide 129 that guides the tape into a generally upright position around wheel 131 with a generally upright axis and towards tooth 130. A detailed view of the tooth 130 is shown in FIGS. 5 and 6 and will be discussed in more detail hereunder.

In the embodiments shown, the tape dispenser sub frame 121 supports not only the tape dispenser 120 but also the tape supply and tape cover sheet discharge, but these are preferred embodiments.

The protective sheet is guided over the tape dispensing end 132 of the tooth 130 back towards a collecting reel 134 having an upright axis that collects protective sheeting by winding in direction 135. In this embodiment reel 134 is driven in direction 135 in order to collect protective sheeting.

Tape applicator 103 is rotatably mounted on carriage sub frame 101. Tape applicator 103 has a rotation axis 150 and tape applicator 104 has a rotation axis 151. Tape applicator 103 comprises a partially rounded generally rectangular tube having holes 153 on tape receiving surface 154 that is shown shaded in FIG. 3. The tape applicator 103 is connected to a vacuum source (not shown) that can apply a vacuum that will invoke a sucking force using openings 153 that will suck a tape onto the tape receiving surface 154.

The tape applicator 103 can be driven around tape rotation axis 150 by a suitable drive 163. The same or a further drive, or using a transmission, can drive tape applicator 104 around rotation axis 151. Suitable servo motors can be applied and the rotation of tape applicators 103 and 104 can be synchronous.

Figure 4A:
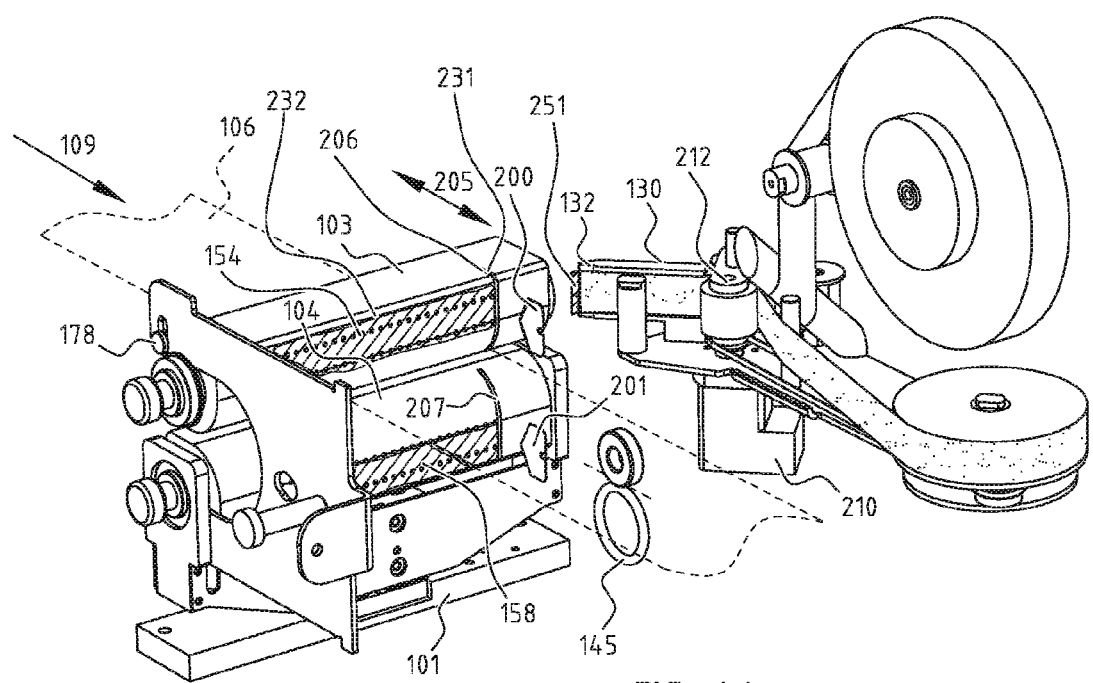

FIG. 4a shows the tape dispenser driving unit 210 connected to roll 212 that can pull the tape protective layer over the tape dispensing end 132 of tooth 130.

Although according to the illustrated embodiment tape applicator 103 will receive a piece of tape, other embodiments are possible. Tape applicator 103 can also comprise a tape dispenser or an adhesive supply or sealing device is provided on the tape applicator 103. The executed methods using the tape applicator 103 (or tape applicator 104) is in no way limited to using a tape.

Tape applicator 104 can move in the direction according to arrow 172 using a suitable drive such as a servo motor. This allows moving the tape applicators towards each other, in this case moving only a single tape applicator 104, to enclose on the foil in between the tape applicator. This will allow applying and connecting tape onto both opposite sides of the flattened tubular tape foil ends.

Now first a method and device will be described for dispensing tape. Clearly other means for making to the connection between a first foil end and a second foil end could be applied in combination with other elements or methods according to this description.

FIG. 4a shows an initial position while foil 106 is being supplied in the downstream direction 109 from the flattened tubular foil supply. Suitable sensors are arranged to determine and measure whether the supply from the reel is running out. At a predetermined moment or after measuring a predetermined signal, the tape dispensing will be initiated followed by the tape applying and tape connecting. In FIG. 4a a splicer state is shown wherein the tape dispenser is ready for tape dispensing.

In the initial tape dispenser state as indicated in FIG. 4a, the tape dispenser end 132 is located generally in the same horizontal plane as the top tape applicator 103 and the tape receiving surface 153. As a result of this positioning, a part 231 from the tape receiving surface part 153 is located close to the tape dispensing end 132 and a part 232 is located more remote. The more remote part 232 is positioned at a larger distance from the tape dispensing end 132 than the part 231.

Figure 4B:
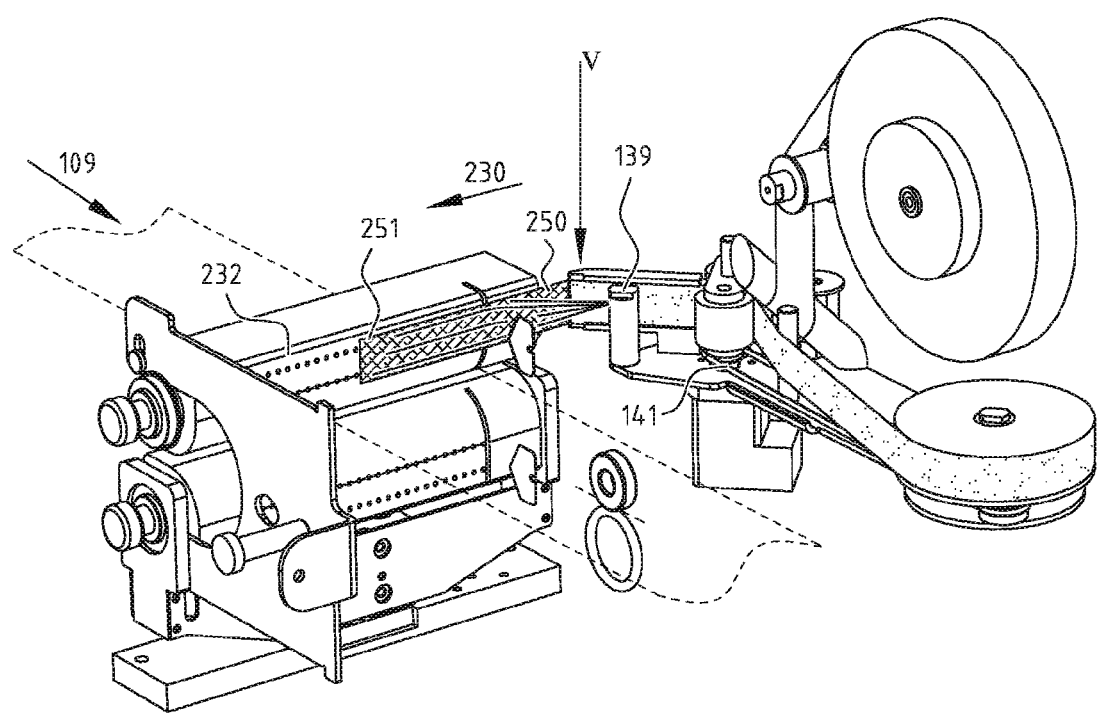
Figure 4C:
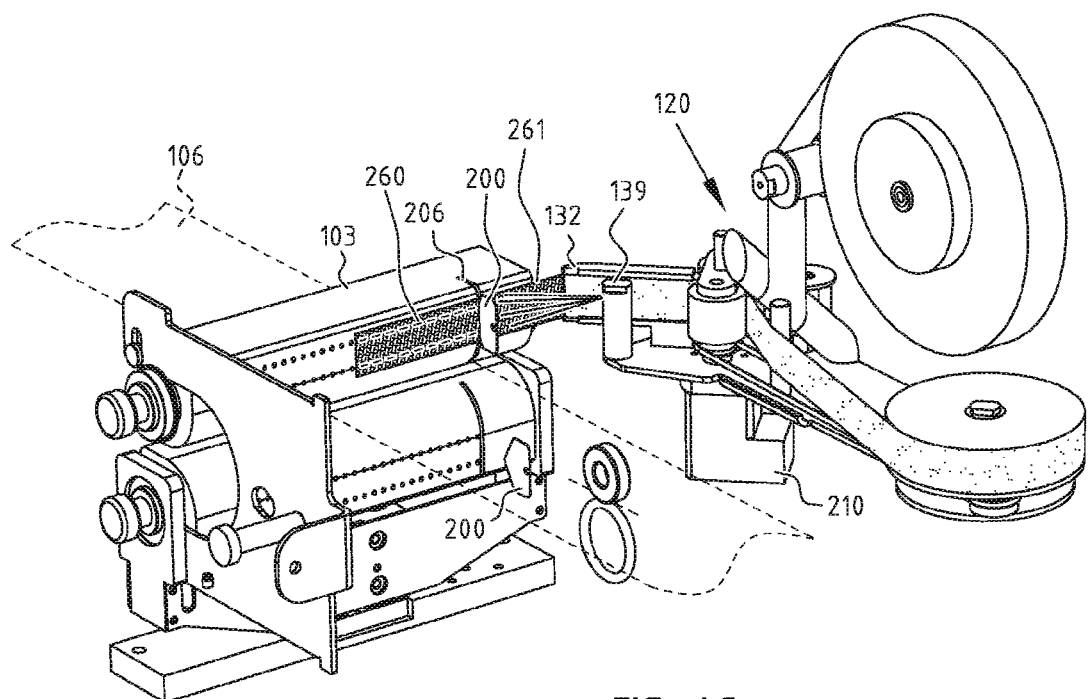
Figure 4D:
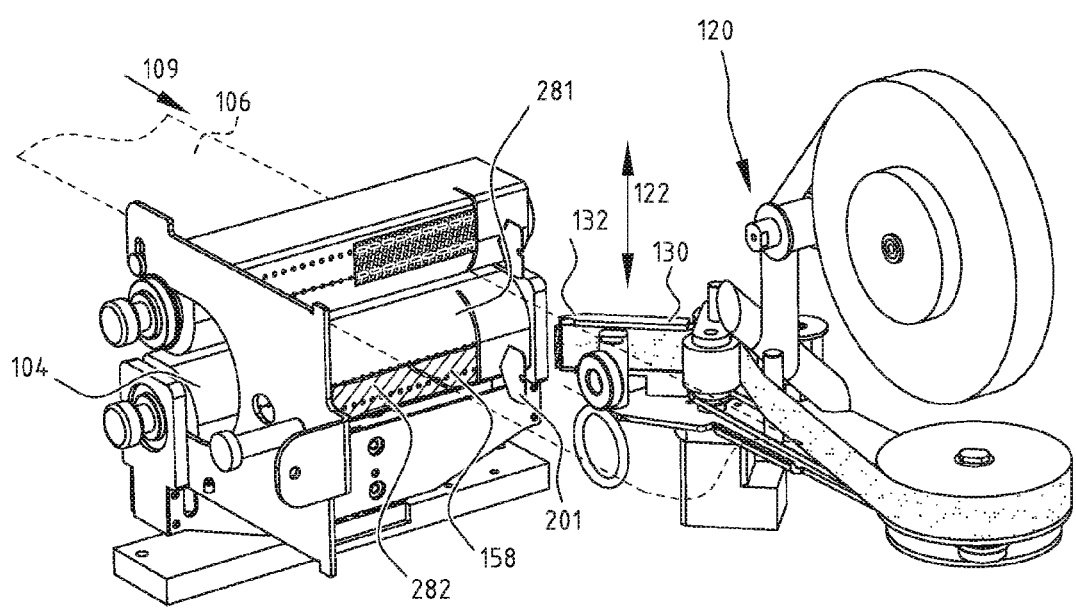

FIG. 4b shows the initiated tape dispensing. From the tape dispensing end 132 tape 250 is dispensed in direction 230 and moved away from the tape dispensing end 132. The tape leading end 251 will reach the tape applicator 103, first at part 231 and, when the dispensing is continued, move in the direction of the remote part 232.

As shown in more detail in FIGS. 5 and 6, during dispensing the actual tape and protective sheet 246 is moved along 248 over tooth 130 in the direction of end 132 and the tape protective sheet 249 is pulled off from the actual tape 250 near the tape dispensing end 132 and continues in direction 247, while actual tape 250 is dispensed in direction 230.

Figure 4E:
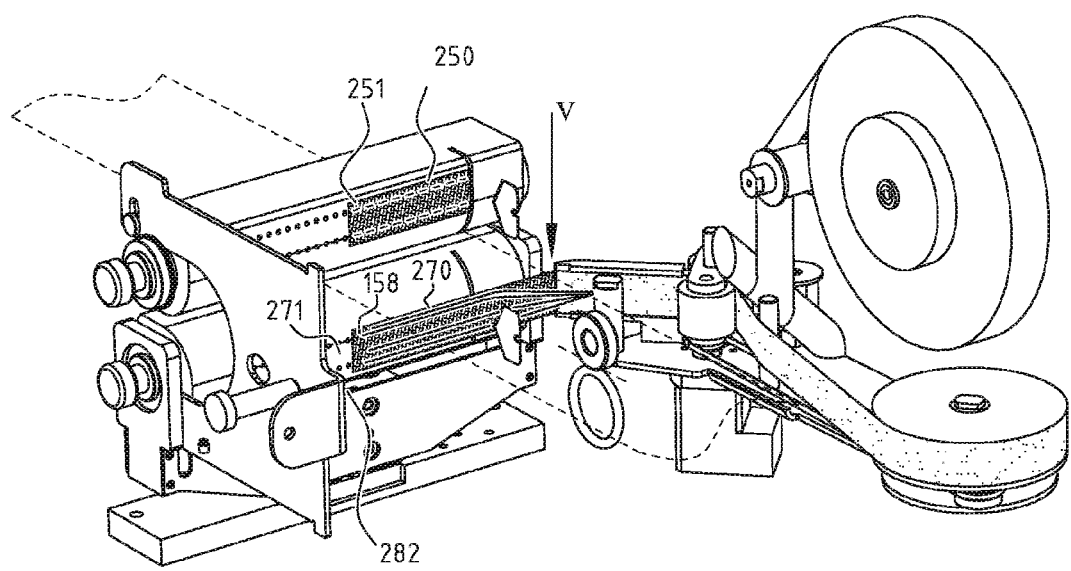
Figure 4F:
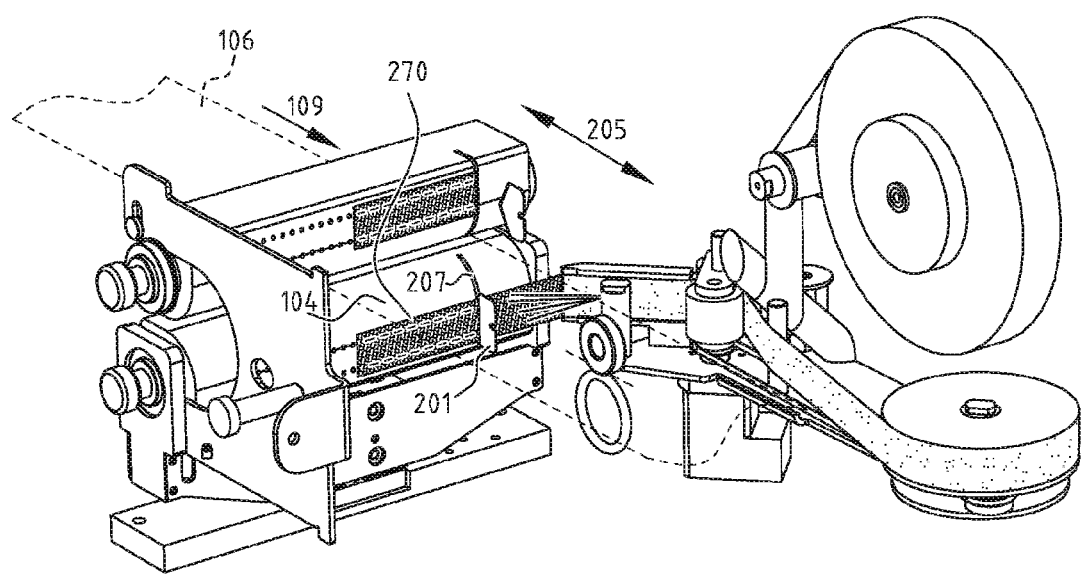
Figure 4G:
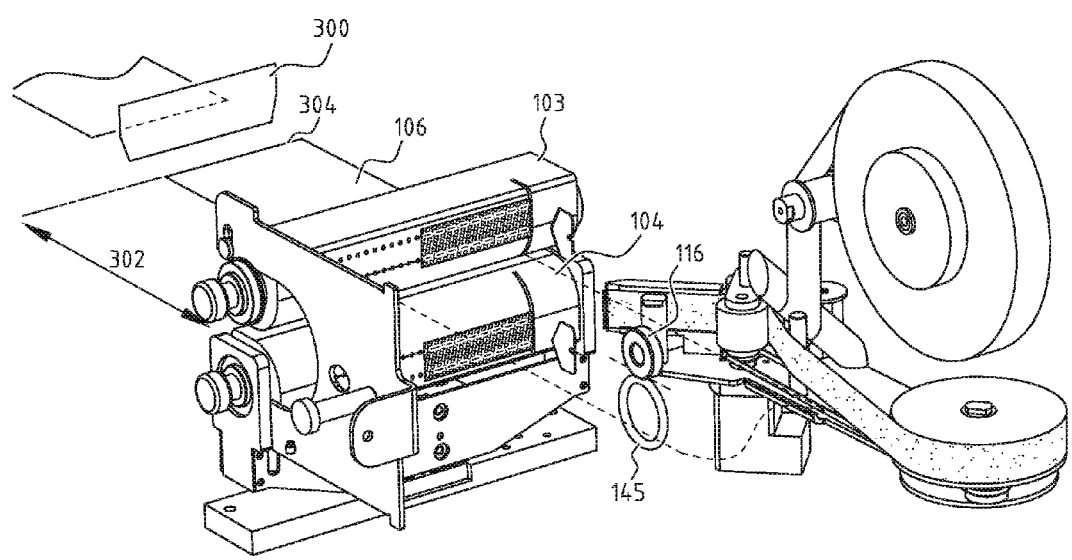

FIG. 5 shows a detail of FIGS. 4b and 4e according to arrow V in FIG. 4b providing a top view. Tape and protective sheeting 246 is provided from a supply and guided between rollers 240, 241 rotating around upright axes.

Roller 242 is connected by a belt 243 to reel 134. Rollers 240,241 and 242 are in frictional direct contact with each other. Tape+protective sheeting and tape sheeting is guided between the respective rollers 240,241,242. One of these rollers 240 can be connected to a suitable drive unit 210. The combined construction of transmissions (frictional/belt) allows drive 210 to drive rollers 240-242 and reel 134. Further rollers 238,239 guide the tape 246.

During the dispensing action as shown in FIG. 4b, a nozzle 139, positioned on the tape dispenser sub frame 121 is switched on and directs gas, such as air, towards the tape 250 being dispensed, pushing the tape 250 onto the tape receiving surface 154 of tape applicator 103. As the nozzle 139 is directed along the tape dispensing direction 230, a somewhat laminar flow of gas will provide a "pushing" force pushing the tape 250 onto the tape receiving surface 154.

A suitable tape 250 is used. Preferably the tape has at least a predetermined amount of rigidity, allowing a horizontal dispensing of the tape while maintaining a generally horizontal direction of the tape without supporting the dispensed end against rotational forces. Preferably the tape stiffness is at least enough to dispense tape in the horizontal direction over at least 5 cm, preferably 8 cm, more preferably 10 cm. A suitable tape is aluminum tape.

In an embodiment an additional force can be provided for maintaining a generally horizontal extension of the tape 250 while being injected from the tape dispenser by providing a (limited) vacuum inside the tape applicator 103. This results in a sucking force of the tape 250 onto the tape receiving surface 154 through the holes 153/154.

While the tape 250 is being dispensed, the tape leading end 251 is moved in the tape dispensing direction 230 passing the proximal part 231 and eventually reaching the remote part 232 of the tape receiving surface 154. The tape end 251 reaches the tape receiving surface accordingly without any other mechanical driving other than the actual tape dispensing, e.g. by pulling the protective layer using the dispensing driving unit 210 and roller 212. This reduces the mechanical complexity of tape dispensing.

During the tape dispensing foil can still be fed in the feeding direction 109 from the (still not empty) reel.

In this application a (finite) remote part 232 of the tape receiving surface is any part of the tape receiving surface that is located more remote than a (finite) proximal part 231 of the tape receiving surface. The remote part does not have to be the most remote part of the tape receiving surface.

In the embodiments according to FIGS. 4b and 4c, the remote part 232 is a part halfway the tape applicator 103 seen in the direction 230 from the tape dispenser. In this embodiment FIG. 4b shows the end position of the tape end 251 when tape dispensing is completed in direction 230. In other embodiments the tape end 251 is moved more remote in tape dispensing direction 230, while, also falling within the scope of the invention, tape dispensing could also have ended more prematurely, bringing the tape end 251 only at one-third or even one-fourth or one-fifth of the total tape receiving surface.

When tape dispensing in the tape dispensing direction 230 has ended, the dispensed tape 250 is locked into position onto the tape receiving surface 154 by applying a vacuum in the tape applicator 103 sucking the tape onto the tape receiving surface 154 through the holes 153. Until or even after locking the tape into position onto the tape receiving surface by the vacuum, the gas nozzle 139 can provide its supporting pushing force.

FIGS. 4a and 4c show tape cutting knives 200 and 201. Tape cutting knife 200 is received in a (not shown) cutting device comprising a house and e.g. an air cylinder that allows displacing the knife 200. The cutting knives can move in direction 205 into a cutting slit 206 provided in tape applicator 103 and cutting slit 207 in tape applicator 104 respectively. This will allow cutting the tape that is provided on the tape receiving surface.

After the tape reaching the end position on the tape receiving surface 154, the tape dispensing in direction 230 is stopped.

When the tape has reached the end position, and preferably after locking the tape into position, the dispensed tape 250 is cut using the schematically illustrated cutting device by driving the knife 200 into the slit 206. This action will separate a part of the dispensed tape 260 from the tape 261 still connected to the tape dispenser. The separated tape part is held onto the tape receiving surface 154 by applying the vacuum.

In an embodiment the tape part extending beyond the tape dispensing end 132 can be retracted e.g. by driving the tape dispenser drive in an opposite direction. In other embodiments part is not retracted or is cut off by an auxiliary cutting device. In the following figures however, the tape extending beyond the tape dispensing end is removed.

FIG. 4d shows the tape dispenser 120 in a second position wherein the tape dispenser sub frame 121 is moved in a generally vertical direction 122 with respect to the tape applicator 103, 104 such that the tape dispenser end 132 is now generally in the same plane as the tape applicator 104 and the tape receiving surface 158. The position of the tape dispenser 120 is generally similar to the initial state although the tape dispenser 120 is now in line with the tape applicator 104.

Although the tape dispenser sub frame 121 is guided in the direction 122 generally perpendicular to the foil trajectory, also other guide directions are possible, e.g. v-shaped.

Generally the same sequence of tape dispensing is executed again, now dispensing tape onto the tape applicator 104. Accordingly, a single tape dispenser is used for applying tape to the tape applicators 103, 104 positioned on opposite sides of the foil moving between the two tape applicators. This results in a substantial saving for cost, while a single guide and drive is needed only. The tape dispenser drive and guide for arranging and controlling the movement in direction 122 of the tape dispenser sub frame 121 with respect to the tape applicators 103,104 and tape receiving surfaces is not shown in FIGS. 4a-4g.

Generally the tape dispenser end 132 moves from a first position in which the tape dispenser end is directed at the tape applicator 103 and the tape receiving surface 154 to a second position directed at the other tape applicator 104 and other tape receiving surface 158.

In an embodiment the foil 106 is still being dispensed from the reel in the foil transport direction 109, as shown in FIG. 4d, when the tape dispenser moves downward to the other tape receiving surface.

In FIG. 4e tape dispensing a second piece of tape 270 with a second tape leading end 271 onto the second tape applicator 104 having a second tape receiving surface 158 is illustrated. The tape is fed from the tape dispensing end 132 and extends there from. The second tape leading end 271 first reaches a proximal part 281 of the second tape receiving surface 158 and is dispensed further so as to reach a less proximal, that is more remote part 282 of the second tape receiving surface 158.

Tape dispensing is in the shown embodiments generally in a horizontal direction wherein the tape extending from the tape dispensing end 132 is unsupported against gravity other than by its internal stiffness and a connection that is maintained with the supply of tape. Some support is offered by a pushing force exerted by a gas flow provided from the nozzle 139.

When tape is dispensed e.g. in a downward vertical direction, in another embodiment, the gas nozzle can prevent curling of the tape back to a winded state.

The tape dispensing is ended when the second tape end 271 reaches a predetermined remote part 282 of the tape receiving surface 158 while further a surface area of tape 270 covers more proximal parts of the tape receiving surface 158. The second tape is then locked into position by providing a vacuum resulting in a sucking force of the tape 270 onto the tape receiving surface 158. Generally, a length of tape is dispensed generally similar to the first tape, still being held on tape receiving surface of tape applicator 103.

Thereafter the dispensed tape 270 is cut using cutting device having a knife 201 that is moved in direction 205 into a slit 207 provided in tape applicator 104 as shown in FIG. 4a. This can be followed by possible retraction of the tape end still extending beyond the tape dispensing end 132.

During the second tape dispensing steps, foil can still be provided from the reel in direction 109. In this embodiment providing the second tape onto the tape applicators and the tape dispensing sequence and can start before the actual tape connection sequence. Preferably the tape dispensing sequence is started a predetermined time before the reel from the foil is empty. Foil can still be continuously supplied during the tape dispensing sequence.

As a last step of the tape dispensing sequence the tape dispenser can be moved back to its initial position, or a following tape dispensing sequence can start with the tape dispensing sub frame located adjacent the second tape applicator 104.

In FIG. 4g a cutting device 30 (as shown in FIG. 1a) having a knife 300 positioned upstream from the tape applicators 103,104 along the foil trajectory, cut the foil 106, at a predetermined distance 302 upstream from the tape applicators. The result is that a predetermined length 302 of foil is available, and a suitable controller can drive the foil in foil transport direction 109 e.g. using the wheel 145 and counter wheel 116 to pull the foil and foil edge 304 in foil transport direction 109. Because the length of the foil is known, exact positioning of the foil edge 304 is possible.

The cutting device 30 can be part of the table 14 as illustrated in FIG. 1.

FIG. 7 illustrates the (partially shown) carriage sub frame 101 moving in a transverse direction 108 with respect to the guidance and cutting table 14 driven by a suitable driver. The foil end 304 of the old foil is conveyed somewhat downstream and held in a predetermined position with respect to the carriage sub frame 101 and tape applicators 103,104. The splicer device 1 allows transverse movement 108 of the carriage sub frame 101 holding the foil end 304 while maintaining the foil connection with further downstream processing units such as a buffer device.

The carriage sub frame is, when 'old' foil is supplied positioned at the first position. The end of the next or further foil is positioned at the second position and the carriage sub frame can be moved, guided or transferred from the first position towards and to the second position.

A foil 308 is supported by the guidance and cutting table 14 in a predetermined position. The foil end 309 has partially removed edges which will allow opening the layers of the tubular foil 308 near end 309. In the predetermined position end 309 will run in between wings 51,52 on carriage sub frame 101 which will bring the end 309 between tape applicators 103,104. Again as a result of the predetermined position of end 309, carriage sub frame 101 is moved over a certain distance allowing the end 309 to be aligned with end 304. The edges of both foils 308 and foil 106 can be aligned. In an embodiment further sensors allow the alignment. The aligned position is shown in FIG. 8a as the initial position of the method for applying and connecting the ends of tubular foil in a splicing device 1 using tape.

Aligning end 304 of the 'old' foil 106 with pieces of tape 154,158 and especially with foil end 309 of a 'new' foil 308 can comprise an engaging device (not shown) arranged to engage foil 106 close to end 304, said engaging device connected to sensors for sensing a (relative) position of end 309 and the engaging device arranged to move at least sideward 110 so as to align the longitudinal edges of the respective foils 106 and 308. In an embodiment the tape receiving surfaces are mounted in the splicer 1 movable in direction 110 so as to allow alignment of the foil ends after applying tape.

Further such an engaging device can fix the relative position of the end 304 with respect to the table frame 101. The engaging device can be positioned on opposite sides of the foil trajectory and can comprise suction units.

Figure 8A:
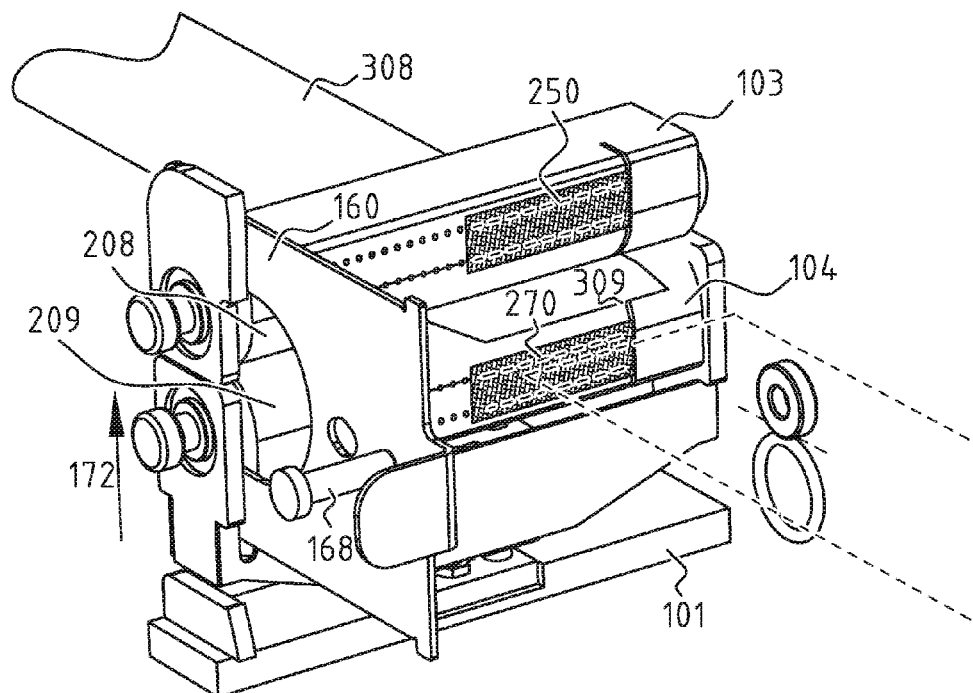

A first step of the illustrated method according to FIG. 8a comprises driving tape applicator 104 in direction 172. Tape applicator 104 is moved towards tape applicator 103. Foil 308 is held between the two tape applicators. The foil end 309 extends in the downstream direction beyond the tape applicators. The foil 308/foil end 309 is still in the predetermined position when held on the guidance and cutting table 14. Stop 20-24 can still be locked, locking the foil 308 in position. During or after the first step of the method stop 20-24 is unlocked.

A suitable drive moves tape applicator 104 with respect to carriage sub frame 101.

Tape applicators 103,104 are rotatably held around axis 150,151 with respect to the carriage sub frame 101. Several bearing constructions and drives are possible.

In the illustrated embodiment synchronous rotation of the tape applicators 103,104 is arranged using frame plate 160 that is guided by horizontal guides 161, 162, see FIG. 2. The guides 161,162 allow frame plate 160 to move in direction 164. Frame plate 160 is connected to servo motor or air cylinder 163.

Figure 8B:
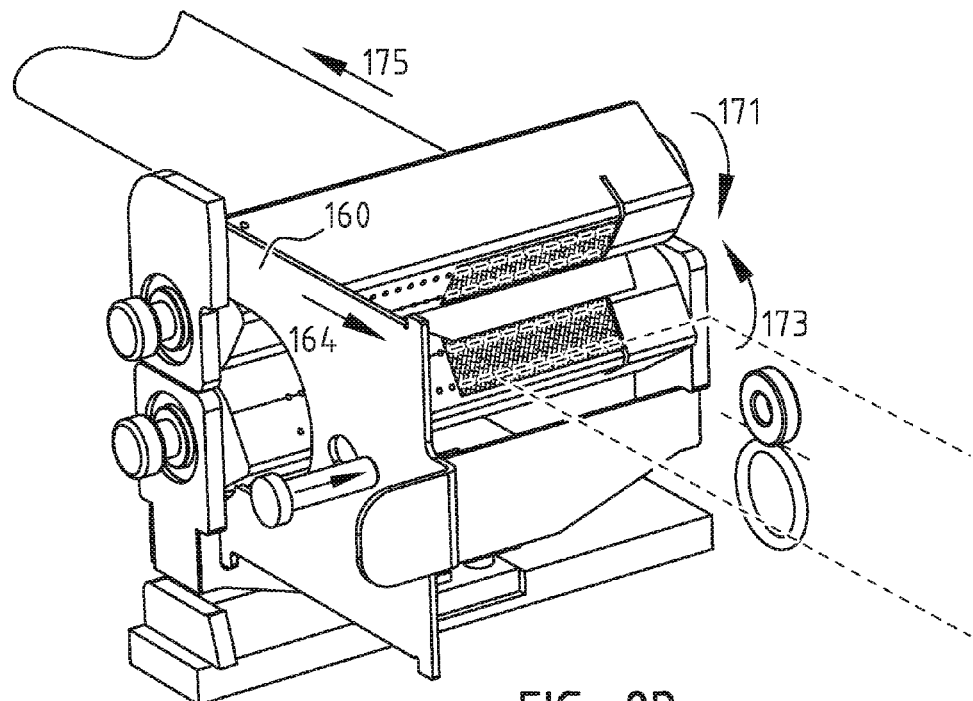
Figure 8C:
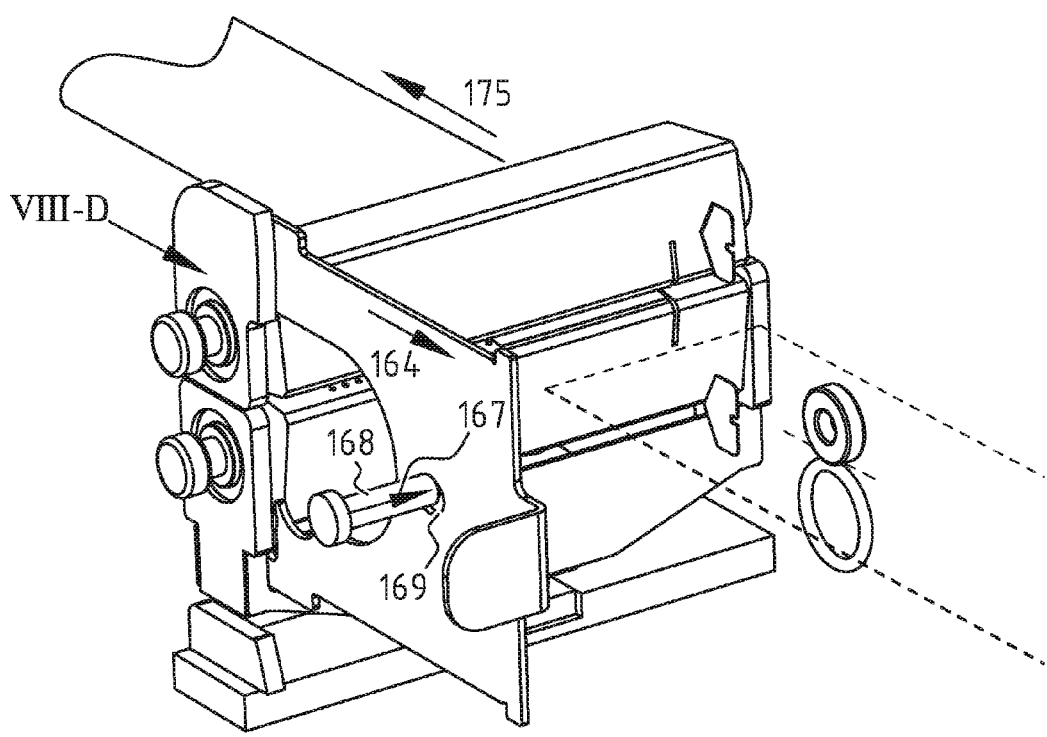

By moving frame plate 160 in the downstream direction of arrow 164, pin 178 on one end of the tape applicator 103 is engaged, as well is a similar pin on tape applicator 104 (not shown). Tape applicator 103 will rotate according to arrow 171. Simultaneously, a likewise engagement on tape applicator 104 will rotate tape applicator 104 in the opposite direction 173 as shown in FIG. 8b.

In this embodiment, as tape applicator 104 is moved according to arrow 172, the foil 308 is held between the tape applicators 103,104. Accordingly the rotation of the tape applicators will move the foil 306 in an upstream direction 175. Specifically the rounded surface area 208,209 of the tape applicators will engage on the foil 208. This cylindrical surface area will point contact the foil 308. Foil 106 is still held in the predetermined position.

The tape applicators 103,104 continue to rotate while frame plate 160 moves in direction 164. A blocking pin 168 will prevent further movement of the plate 160 as blocking pin 168 is biased 167 to enter through hole 169. As soon as blocking pin 168 enters the hole 169, further movement/rotation is blocked. This will prevent the two tapes 250,270 from sticking together. FIG. 3 shows an air cylinder 175 for operating the pin 168.

Hole 169 is larger than the circumference of pin 168. When pin 168 is received in hole 169, the plate 160 can still be moved in either direction 164 or 165. The orifice of hole 169 provides a domain within which plate 160 can move, and thereby a domain of angles for rotation of the tape applicators 103,104.

Figure 8D:
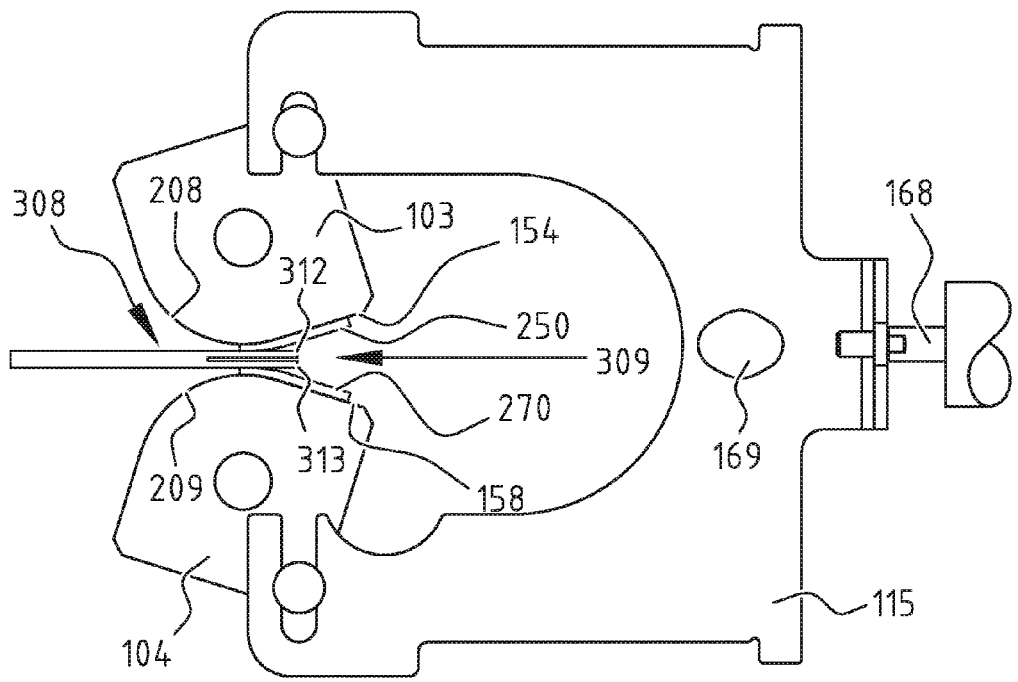

Rotation of the tape applicators 103,104 continues to such an extent, about 75-85°, that the tape receiving surface and tapes 250,270 still held onto the tape receiving surfaces 154,158 will come into contact with the foil 308 and in particular close to foil end 309. A cross sectional view is shown in FIG. 8d indicated by arrow VIIId in FIG. 8c.

The adhesive side of tape 250,270 will come into contact with the upper 312 and lower 313 layers of the foil 308/foil end 309 respectively. Tape is now applied to the foil end 309 of one of the foils to be connected using the splicer 1.

Blocking pin 168 prevents the further rotation. As a result rotation of the tape applicators such that tape 250/270 will come in contact with each other is prevented. According to the method the predetermined position of foil end 309 is such that only a part of the tapes 250/270 will come in contact with the respective layers 312,313 of the foil 308. If rotated too far, the tapes would come into contact with each other. The blocking pin 168 prevents rotation beyond the indicated position in FIG. 8d.

Figure 8E:
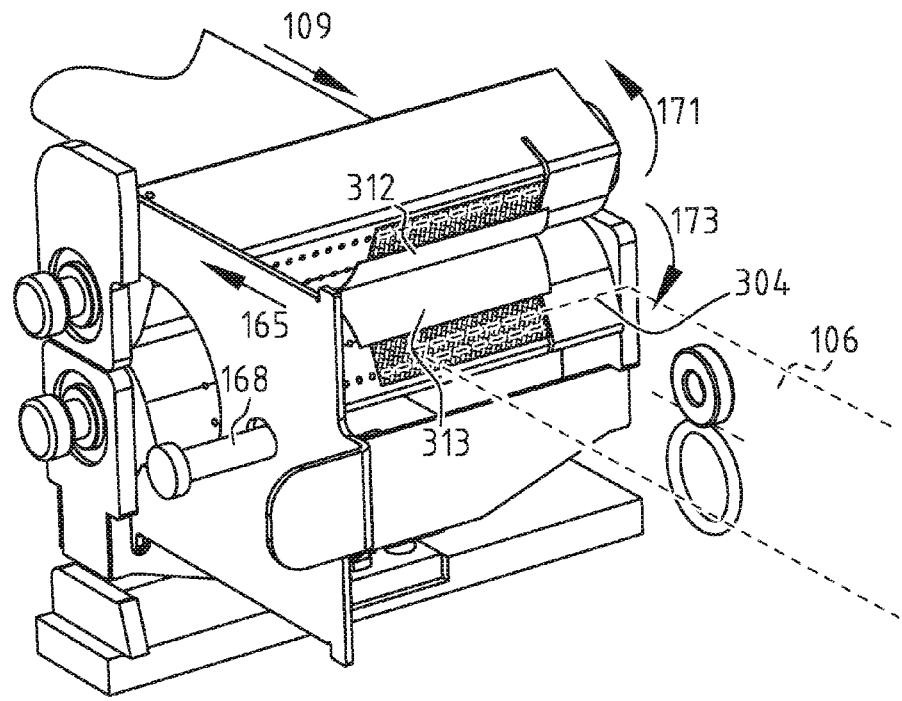

As a result of the adhesive contact a subsequent reverse movement of the frame plate 160 by driving the plate 160 in direction 165 as shown, the engaged layers (or lips) 312,313 and foil 308 will be pulled in a downstream direction as a result of rotation 171/173. The tapes 250,270 will stick to the layers 312,313 opening the mouth of foil end 309 as shown in FIG. 8e. About 50% of the tape 250,270 is sticks to layers 312,313.

Pin 168 is still extended in FIG. 8e in hole 169. Hole 169 is shaped such that plate 160 can move and rotation of the tape applicators to the opened mouth position according to FIG. 8e can be obtained. Pin 168 delimits the rotation of the tape applicator to e.g. a domain between 45 and 85 degrees.

Figure 8F:
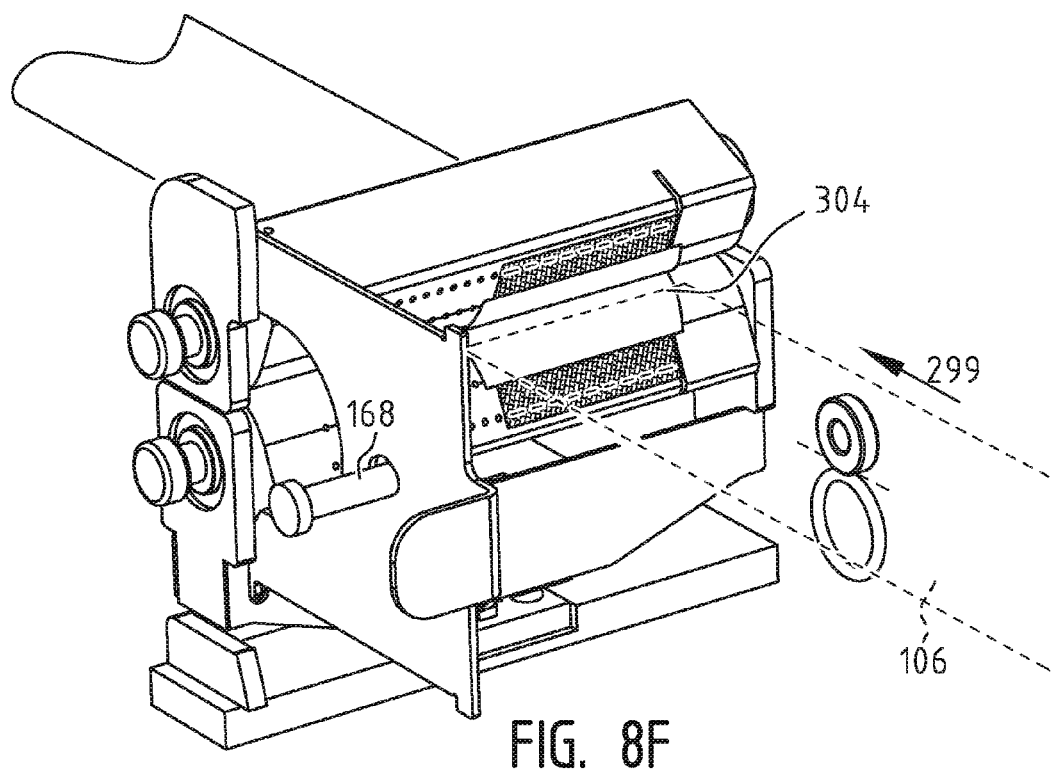
Figure 8G:
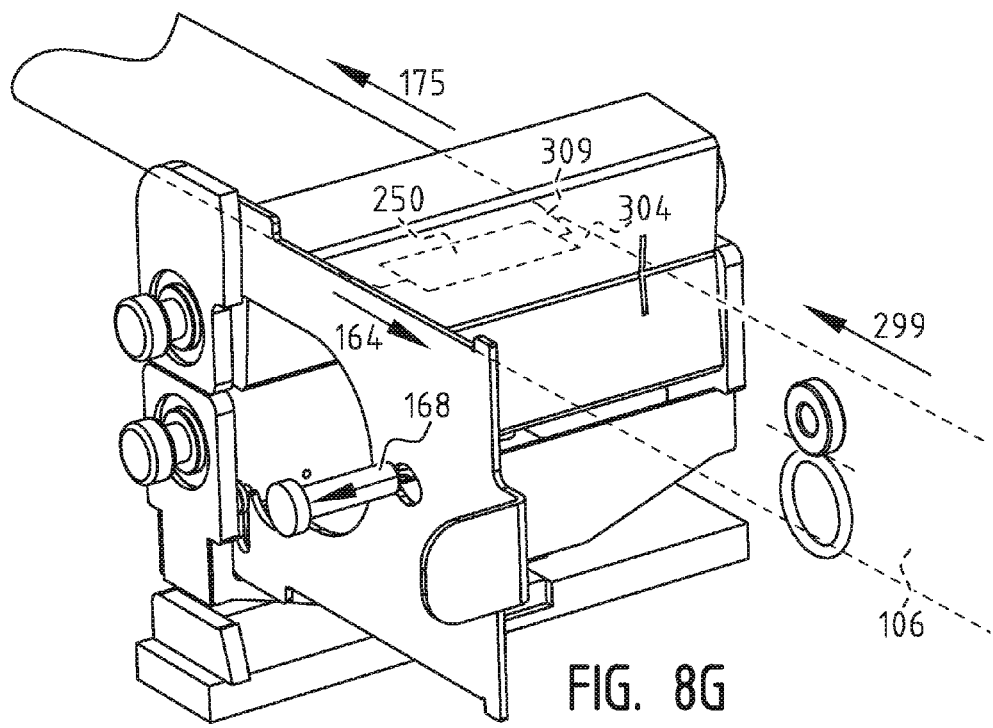

The opened foil end 309 can now receive the foil end 306 of the first foil 106 still held in a predetermined position between the separated lips. As a result of the predetermined position a drive can feed the 'old' foil 106 in an upstream direction according to arrow 299 into the opened foil end 309 as illustrated in FIG. 8f. The method provides for feeding the old foil a predetermined distance in the upstream direction.

The foil end 304 is supported e.g. by table 180 of the foil alignment unit 105. This table, having an edge shortly downstream from the tape applicators 103,104 guides the end 304 into the opened mouth.

The upstream feeding according to arrow 299 is continued in a subsequent step in combination with moving the frame plate 160 and thereby rotating the tape applicators and moving the 'new' foil in an upstream direction 175. Now pin 168 is unbiased (or retracted) and moving of the frame plate is not stopped by the pin 168 entering the through hole 169. Instead the plate 160 is moved beyond the position according to the FIG. 8d.

Accordingly after feeding the foil 106 in the upstream direction into the opened lips of the new foil 308, feeding in the upstream direction is continued now together with feeding the new foil 308 also in the upstream direction.

Accordingly the invention allows the combined upstream feeding of the old foil 106 and new foil 308 in particular for applying the pieces of tape 154,158, already applied to the leading edge 309 of the new foil, to the 'old' foil 106, thereby making the connection between the foil ends.

As a result the complete tape 250,270 is applied onto the foil ends 309/304. The foil ends 304,309 are connected.

Figure 8H:
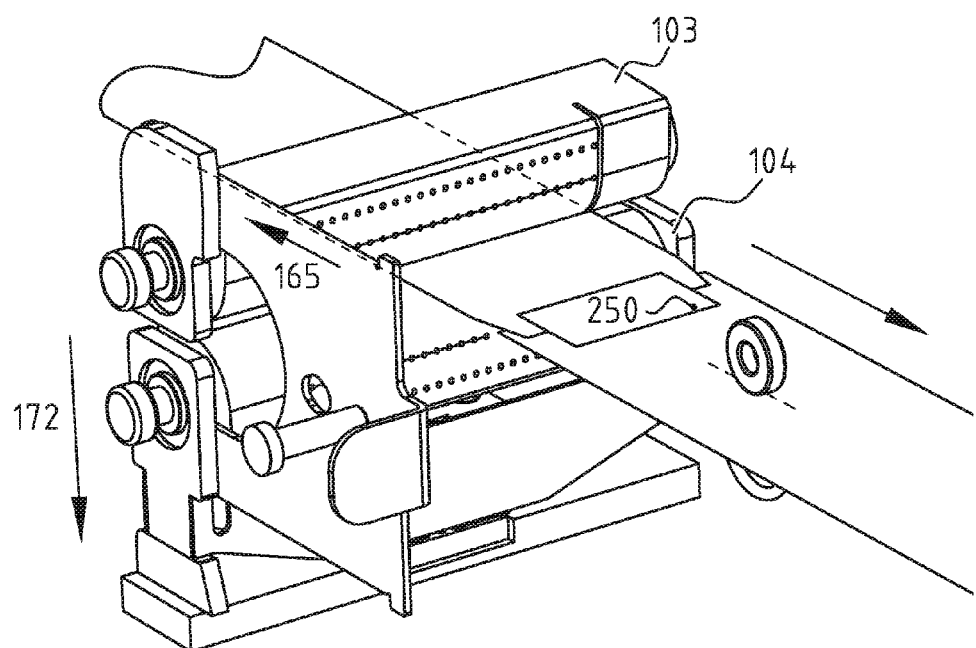

In a subsequent step the tape applicator 104 is moved downwards 172 allowing the foil to freely move between the tape applicators 103,104 and the frame plate 160 is returned to its initial position, rotating the tape applicators back to the initial position, as shown in FIG. 8h.

In an embodiment the foil 106,308 is provided with markers, e.g. markers along the edge of the foil, e.g. positioned at a predetermined pitch. The markers allow an exact positioning of the foil with respect to a marker sensor positioned along the foil trajectory.

In an embodiment the number of markings is counted, allowing to count whether the supply of foil is running empty, as a reel of foil has a predetermined number of markings at predetermined pitch positioned on the supplied foil. The skilled person will be able to arrange suitable markers, suitable sensors and adapt the above described method for positioning accordingly.

Clearly many embodiments are possible within the scope of the invention. Any explicit or implicit combination of features mentioned in this disclosure feasible to the skilled person is disclosed.

The invention claimed is:

1. A method for forming a tubular foil, the method comprising:
    supplying and buffering a first tubular foil from a first supply in a transport direction;
    supplying a second tubular foil from a second supply;
    connecting an end of the first tubular foil to an end of the second tubular foil from the second supply with at least one tape applicator and a drive, the at least one tape applicator being mounted rotatably around a tape applicator axis extending generally perpendicular to a transport direction of the first or second tubular foil, the drive being configured to drive the at least one tape applicator around the tape applicator axis, the end of the first tubular foil being connected to the end of the second tubular foil by:
        rotating the at least one tape applicator in a first direction to apply tape to the second tubular foil followed by rotation in a second, opposite direction to open the end of the second tubular foil supplied from the second supply,
        moving the end of the first tubular foil in a direction opposite the transport direction into the opened end of the second tubular foil from the second supply, and
        applying tape to the end of the first tubular foil and to the end of the second tubular foil so as to connect the first tubular foil to the second tubular foil by the at least one tape applicator; and
    supplying and buffering the second tubular foil supplied from the second supply in the transport direction.

2. The method of claim 1, further comprising:
    supplying and buffering the first tubular foil from the first supply in a transport direction;
    supplying the second tubular foil from the second supply;
    holding an end of the first tubular foil from the first supply by a connecting unit;
    moving the connecting unit from a position of the first supply to a position of the second supply;
    connecting the end of the first tubular foil to an end of the second tubular foil from the second supply; and
    supplying and buffering the second tubular foil supplied from the second supply in the transport direction;
    wherein connecting the ends of tubular foils includes:
        opening the end of the second flattened tubular foil supplied from the second supply by the connecting unit;
        moving the end of the first tubular foil relative to the connecting unit in a direction opposite the transport direction into the opened end of the second tubular foil from the second supply;
        applying tape to the end of the first tubular foil and to the end of the second tubular foil so as to connect the first tubular foil to the second tubular foil.

3. The method according to claim 2, further comprising:
    moving a tape applicator having tape towards the end of the second tubular foil;
    applying tape onto the end of the second tubular foil;
    moving the tape applicator away from the foil end of the second tubular for opening the foil end;
    moving the end of the first tubular foil into the opened second tubular foil end;
    moving the tape applicator with tape towards the end of the first tubular foil;
    applying the tape applied to the end of the second tubular foil onto the end of the first tubular foil;
    releasing the tape from the tape applicator.

4. The method according to claim 2, further comprising:
    holding tape on the at least one tape applicator including applying a sucking force on the tape from the tape receiving surface; and/or
    releasing tape from the at least one tape applicator including removing a sucking force from a tape receiving surface on the tape.

5. The method as claimed in claim 1, further comprising:
    applying an adhesive side of one-sided adhesive tape to the end of the first tubular foil and opening the end of the first tubular foil by pulling the adhesive tape sticking to the end of the first tubular foil; and/or
    dispensing tape on a tape receiving surface of a tape applicator, holding the tape on the tape receiving surface, and applying the tape to at least one end of the first tubular foil.

6. The method according to claim 5, further comprising:
    synchronously rotating a first tape applicator arranged at a first side of a foil and a second tape applicator arranged at a second, opposite side of a foil end of the second tubular foil for applying tape to both sides of the foil end of the second tubular foil.

7. The method according to claim 1, further comprising:
    arranging tape on a first tape receiving surface of a first tape applicator and arranging tape on a second tape receiving surface of a second tape applicator while supplying and buffering the first tubular foil from the first supply in the transport direction, wherein
    the foil ends of the first tubular foil are connected by two tapes on opposite sides of the first tubular foil, and
    applying the tape includes: (i) moving the two tape receiving surfaces towards each other; and/or (ii) feeding first tubular foil to a sleeving apparatus, cutting sleeves from the first tubular foil and arranging the sleeves around containers transported on a conveyor.

8. A device for continuously providing tubular foil, the device comprising:
    a first supply for supplying a first tubular foil;
    a second supply for supplying a second tubular foil;
    a processing unit configured to transport the first tubular foil or the second tubular foil, wherein the first tubular foil or the second tubular foil is transported in a transport direction according to a foil trajectory;

a buffering unit configured to buffer an amount of the first tubular foil or the second tubular foil received from the processing unit;

a connecting unit positioned downstream from the first supply along the foil trajectory, the connecting unit including:
- a tape applicator mounted rotatably around a tape applicator axis extending generally perpendicular to a transport direction of the first or second tubular foil, the tape applicator being arranged to apply tape to and connect an end of the first tubular foil to an end of the second tubular foil, and
- a drive configured to drive the tape applicator around the tape applicator axis, the drive being arranged to rotate the tape applicator in a first direction to apply tape to the second tubular foil followed by rotation in a second, opposite direction to open the end of the second tubular foil;

wherein the device is arranged to transport a closed end of the first tubular foil in a direction opposite the transport direction into the opened end of the second tubular foil.

9. The device as claimed in claim 8, wherein
the connecting unit is movable between a position of the first supply and a position of the second supply, and
the device is arranged to transport the closed end of the first tubular foil relative to the connecting unit in a direction opposite the transport direction into the opened end of the second tubular foil.

10. The device according to claim 8, further comprising:
a processing unit including the drive for driving the first or second tubular foil in an upstream direction, opposite the transport direction, the processing unit being configured to move the first or second tubular foil in the upstream and downstream direction, wherein
the connecting unit is configured to:
- move the tape applicator with tape towards the end of the second tubular foil for applying tape onto the end of the second tubular foil;
- move the tape applicator away from the foil end of the second tubular foil for opening the foil end;
- move the end of the first tubular foil into the opened second tubular foil end;
- move the tape applicator with tape towards the end of the first tubular foil for applying the tape applied to the end of the second flattened tubular foil onto the end of the first tubular foil;
- move the tape applicator away from the foil ends of the first and/or second tubular foils for releasing the tape from the tape applicator.

11. The device according to claim 8, wherein the tape applicator is configured to: (i) hold a tape by applying a sucking force on the tape from a tape receiving surface, (ii) release tape by removing a sucking force on the tape, and/or (iii) pull the end of foil in an upstream direction.

12. The device according to claim 8, wherein at least two tape applicators are mounted on opposite sides of the foil trajectory, the at least two tape applicators having generally parallel extending tape surfaces.

13. The device according to claim 8, wherein
at least one of the tape applicator is mounted on a table sub frame moveable with respect to a frame of the device over a table guide extending generally perpendicular to the foil trajectory,
the device includes multiple adjacent reel racks for mounting reels for the first tubular foil, forming multiple adjacent foil supplies, and
the device includes an alignment unit configured to align the ends of the first tubular foil.

14. The device according to claim 8, wherein
the connecting unit includes a tape dispenser configured to supply tape to the tape applicator, and
the tape applicator includes a tape receiving surface that is arranged to receive tape from the tape dispenser.

\* \* \* \* \*